United States Patent
Yamamoto

(10) Patent No.: US 7,522,494 B2
(45) Date of Patent: Apr. 21, 2009

(54) CONTROL OF LASER EMISSION POWER FOR RECORDING INFORMATION ON OPTICAL DISC

(75) Inventor: Kazutaka Yamamoto, Kanagawa (JP)

(73) Assignee: Ricoh Company, Ltd, Tokyo (JP)

( * ) Notice: Subject to any disclaimer, the term of this patent is extended or adjusted under 35 U.S.C. 154(b) by 878 days.

(21) Appl. No.: 10/924,869

(22) Filed: Aug. 25, 2004

(65) Prior Publication Data

US 2005/0047316 A1 Mar. 3, 2005

(30) Foreign Application Priority Data

Aug. 27, 2003 (JP) .............................. 2003-303207
Dec. 26, 2003 (JP) .............................. 2003-432519

(51) Int. Cl.
*G11B 7/00* (2006.01)

(52) U.S. Cl. .................................. 369/47.5; 369/53.26

(58) Field of Classification Search ................. 369/47.5, 369/53.26

See application file for complete search history.

(56) References Cited

U.S. PATENT DOCUMENTS

| | | | |
|---|---|---|---|
| 5,197,059 A | | 3/1993 | Minami et al. |
| 5,629,913 A | * | 5/1997 | Kaku et al. ............. 369/47.52 |
| 5,732,055 A | * | 3/1998 | Masaki et al. ............ 369/53.26 |
| 6,163,515 A | | 12/2000 | Yamamoto |
| 6,400,673 B1 | * | 6/2002 | Shigemori .................. 369/116 |
| 2002/0060961 A1 | | 5/2002 | Yamamoto |
| 2003/0002414 A1 | | 1/2003 | Yamamoto |
| 2003/0048720 A1 | | 3/2003 | Yamamoto |
| 2003/0048821 A1 | | 3/2003 | Iimura et al. |
| 2003/0067857 A1 | | 4/2003 | Shirota et al. |
| 2003/0142606 A1 | | 7/2003 | Ogawa et al. |
| 2003/0142607 A1 | | 7/2003 | Seo |
| 2003/0235128 A1 | * | 12/2003 | Sasaki et al. ............. 369/59.11 |
| 2004/0066720 A1 | | 4/2004 | Yamamoto |
| 2004/0125730 A1 | | 7/2004 | Yamamoto |
| 2004/0257952 A1 | * | 12/2004 | Kimura ................... 369/59.12 |

FOREIGN PATENT DOCUMENTS

| | | |
|---|---|---|
| EP | 1-102-247 A2 | 5/2001 |
| JP | 1-302788 | 12/1989 |
| JP | 04-90143 | 3/1992 |
| JP | 06-325399 | 11/1994 |
| JP | 7-141677 | 6/1995 |
| JP | 08-249661 | 9/1996 |

(Continued)

OTHER PUBLICATIONS

English Translation of JP07129955, published May 19, 1995.*

*Primary Examiner*—Wayne R Young
*Assistant Examiner*—Lixi Chow
(74) *Attorney, Agent, or Firm*—Dickstein Shapiro LLP

(57) ABSTRACT

An optical disc apparatus for recording and reproducing information with respect to a rewritable optical disc includes a reproducing unit configured to reproduce information recorded on the optical disc by shining a laser beam having read power on the optical disc, and a recording unit configured to record information on the optical disc by alternately shining a laser beam having write power and a laser beam having bottom power lower than the write power on the optical disc at a portion where a mark is to be created, wherein the recording unit sets the bottom power to zero.

7 Claims, 17 Drawing Sheets

FOREIGN PATENT DOCUMENTS

| | | |
|---|---|---|
| JP | 09 288840 A | 11/1997 |
| JP | 11-185275 | 7/1999 |
| JP | 2001-344752 | 12/2001 |
| JP | 2002-57403 | 2/2002 |
| JP | 2002-245653 | 8/2002 |
| JP | 2002-298417 | 10/2002 |
| JP | 2002-334433 | 11/2002 |
| JP | 2002-334440 | 11/2002 |
| JP | 2003-323717 | 11/2003 |
| WO | WO-2004-059622 A2 | 7/2004 |

* cited by examiner

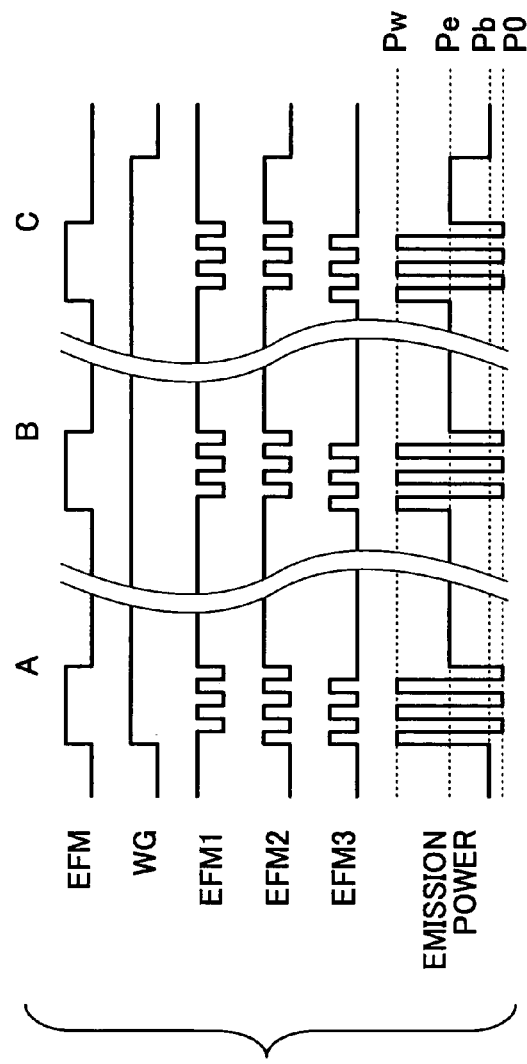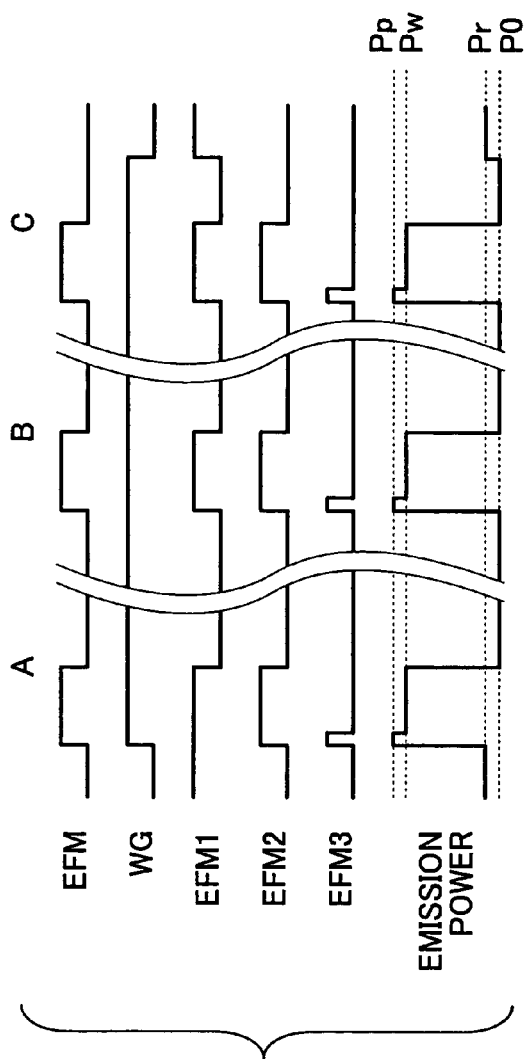

CONTROL OF LASER EMISSION POWER FOR RECORDING INFORMATION ON OPTICAL DISC

BACKGROUND OF THE INVENTION

1. Field of the Invention

The present invention generally relates to optical disc apparatuses and methods of recording and reproducing data.

2. Description of the Related Art

In CD-RW media, reversible transitions between a crystalline phase and an amorphous phase, which have respective reflective indexes, achieve the recording of information. Whether the recording film turns into the crystalline phase or the amorphous phase depends on the speed of cooling after the application of heat. Slow cooling provides a crystalline phase, and rapid cooling achieves an amorphous phase.

In practice, a laser beam having predetermined erase power Pe is scanned to create a crystalline phase (space). A laser beam having large write power Pw and small bottom power Pb, which are repeated at short intervals, is scanned to create an amorphous phase (mark). A laser beam having read power Pr is shone on a recorded CD-RW disc to read amorphous phase marks.

Conventionally, sufficient record quality is achieved even if the bottom power Pb and the read power Pr are the same.

Because of the recent improvement of record films used in the CD-RW media, speed at which information is properly recorded on the CD-RW media has been increasing. With such an increase in recording speed, a power margin has been decreasing, resulting in difficulties in providing stable record quality when compared with the use of a slower recording speed.

In the following, technologies relating to a related-art optical disc apparatus will be described.

<Technology 1>

For every 2T increase in the mark data length, the number of heating pulses and the number of cooling pulses are increased by one, respectively. This achieves sufficient heating and cooling even at high recording speed (Japanese Patent Application Publication No. 2002-334433).

<Technology 2>

The laser diode exhibits a linear relationship between an electric current and the power of light emission when the electric current is sufficiently large to generate emission power exceeding a predetermined level. This makes it easier to select the erase power Pe and the write power Pw.

Nowadays, many notebook-type personal computers are equipped with a CD-R drive. Since notebook-type personal computers are typically driven by use of a buttery, the CD-R drive provided as a peripheral needs to be designed to run with small power.

In the recording of CD-R media, pits are created by severing a record film by heat. In practice, a laser beam having the read power Pr is applied during the scan for creating a space, and a laser beam having the write power Pw is applied during the period for creating a mark.

<Technology 3>

In a large number of existing laser drivers, maximum tolerable electric currents are different for respective channels. Each channel has its specific usage such as the read purpose or the write purpose, and the design of an electric current is made to conform to the respective usage. A recording apparatus having three channels, for example, may be designed such that the maximum tolerable current is 50 mA for channel 1, 150 mA for channel 2, and 100 mA for channel 3. In the case of CD-R media, for example, the channel 1 is used for producing read power, the channel 2 for producing write power, and the channel 3 for producing peak power. In the case of CD-RW, for example, the channel 1 is used for producing base power, the channel 2 for producing erase power, and the channel 3 for producing write power.

In related-art optical disc apparatuses, the speed of recording CD-RW. media is slower than the speed of recording CD-R media. Because of this, the record power would not be perceived as lacking sufficient power.

The technologies relating to the related-art optical disk apparatuses described above have drawbacks as follows.

<Problem 1>

A laser diode used in the related-art optical disc apparatuses for recording CD-RW media does not exhibit a linear relationship between an electric current and the power of light emission in the region where the light emitting power is small. If the erase power Pe is excessively reduced, thus, a problem will be encountered in selecting the erase power Pe and the write power Pw.

Accordingly, there is a need for a scheme that improves record quality in high-speed recording without affecting the write power and the erase power.

<Problem 2>

In general, the power of light emission of a laser diode is set to a small level for the read power Pr. However, the relationship between an electric current and the power of light emission has such characteristics that large current is consumed even for the small level of the read power Pr. This results in the requirement of an excessive current despite the fact that relatively small emission power is necessary.

Accordingly, there is a need for a scheme that reduces current consumption at the time of recording by suppressing current consumption in the region where a space is created.

<Problem 3>

It appears that the recording speed of CD-R media has recently been reaching its maximum limit, whereas the recording speed of CD-RW media is yet increasing. This gives rise to a problem in that sufficient recording power cannot be attained for the recording of CD-RW media. For example, a current of 80 mA may be necessary as erase power, and a current of 120 mA may be necessary as write power. In such a case, a problem is encountered in that the current of the channel 3 exceeds its tolerable current limit.

The setting of emission power, i.e., a setting made to a current source for driving a laser diode, is generally done by a DA converter. When the maximum level of emission power and the resolution of settings are taken into consideration, the use of a 10-bit DA converter is generally required. Because of the large chip size of a DA converter, it is desirable to reduce the number of bits required for the DA converter.

Accordingly, there is a need for a scheme that broadens the range of power settings in response to a required amount of a current even when each current source is designed for a respective current amount corresponding to its predetermined usage.

SUMARY OF THE INVENTION

It is a general object of the present invention to provide an optical disc apparatus and an apparatus for driving a light source that substantially obviate one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description.

Objects as well as other features and advantages of the present invention will be realized and attained by an optical disc apparatus and an apparatus for driving a light source particularly pointed out in the specification in such full, clear, concise, and exact terms as to enable a person having ordinary skill in the art to practice the invention.

To achieve these and other advantages in accordance with the purpose of the invention, the invention provides an optical disc apparatus for recording and reproducing information with respect to a rewritable optical disc. The optical disc apparatus includes a reproducing unit configured to reproduce information recorded on the optical disc by shining a laser beam having read power on the optical disc, and a recording unit configured to record information on the optical disc by alternately shining a laser beam having write power and a laser beam having bottom power lower than the write power on the optical disc at a portion where a mark is to be created, wherein the recording unit sets the bottom power to zero.

According to the optical disc apparatus described above, the laser beam having the bottom power is actually turned off. This provides for only a rapid-cooling pulse to be reduced in power when the rapid-cooling pulse is generated during a cooling period of the record-mark creating process, i.e., during a period in which the light emitting device is driven with the bottom power. With this provision, record quality at high recording speed is improved without affecting the write power and the erase power.

According to at least one embodiment of the invention, the optical disc apparatus as described above further includes a read-power setting unit configured to adjust an electric current for generation of the read power in a stepwise manner, wherein the write power is responsive to a sum of the electric current and another electric current, and the recording unit adjusts the write power by causing the read-power setting unit to adjust the electric current for generation of the read power in the stepwise manner.

In the optical disc apparatus as described above, the read power that is generated by an electric current signal having small power and the high resolution of settings is adjusted in order to adjust the write power, thereby improving the resolution of settings of the write power that is used for recording. This provides sufficient emission power and the sufficient resolution of settings while achieving cost reduction.

According to at least one embodiment of the invention, an optical disc apparatus for recording and reproducing information with respect to a write-once optical disc includes a reproducing unit configured to reproduce information recorded on the optical disc by shining a laser beam having first read power on the optical disc, and a recording unit configured to record information on the optical disc by shining a laser beam having write power on the optical disc at a portion where a mark is to be created, and by shining a laser beam having second read power lower than the write power on the optical disc at a portion where a space is to be created, wherein the recording unit sets the second read power to zero.

According to the optical disc apparatus described above, the laser beam having the read power is actually turned off during the recording operation. This provides for the consumption of an electric current to be eliminated at the position where a space is to be created, thereby reducing the consumption of an electric current during the recording process.

According to at least one embodiment of the invention, the optical disc apparatus as described above further includes a read-power setting unit configured to adjust an electric current for generation of the first read power in a stepwise manner, wherein the write power is responsive to a sum of the electric current and another electric current, and the recording unit adjusts the write power by causing the read-power setting unit to adjust the electric current for generation of the first read power in the stepwise manner.

In the optical disc apparatus as described above, the read power that is generated by an electric current signal having small power and the high resolution of settings is adjusted in order to adjust the write power, thereby improving the resolution of settings of the write power that is used for recording. This provides sufficient emission power and the sufficient resolution of settings while achieving cost reduction.

According to at least one embodiment of the invention, an optical disc apparatus for recording and reproducing information with respect to an optical disc includes a driver unit having a plurality of electric current sources providing respective electric currents and configured to supply an electric current responsive to the electric currents, a light emitting device configured to emit a laser beam having power responsive to the electric current, a reproducing unit configured to reproduce information recorded on the optical disc by causing the light emitting device to shine the laser beam having read power on the optical disc, a recording unit configured to record information on the optical disc by causing the light emitting device to shine the laser beam having write power on the optical disc at a portion where a mark is to be created, and by causing the light emitting device to shine the laser beam having erase power lower than the write power on the optical disc at a portion where a space is to be created, and a current-source setting unit configured to interchange the electric current sources between an electric current source used for generation of the write power and an electric current source used for generation of the erase power.

In the optical disc apparatus described above, channels are interchanged as such a need arises according to the required amounts of electric currents. The provision is thus made to broaden the range of power settings in response to the required amounts of electric currents even when each current source is designed for a predetermined specific usage.

According to at least one embodiment of the invention, the optical disc apparatus as described above further includes a read-power setting unit configured to adjust an electric current for generation of the read power in a stepwise manner, wherein the write power is responsive to a sum of the electric current for generation of the read power and another electric current, and the recording unit adjusts the write power by causing the read-power setting unit to adjust the electric current for generation of the read power in the stepwise manner.

In the optical disc apparatus as described above, the read power that is generated by an electric current signal having small power and the high resolution of settings is adjusted in order to adjust the write power, thereby improving the resolution of settings of the write power that is used for recording. This provides sufficient emission power and the sufficient resolution of settings while achieving cost reduction.

According to at least one embodiment of the invention, a method of recording information on an optical disc includes a step of alternately shining a laser beam having write power and a laser beam having bottom power lower than the write power on the optical disc at a portion where a mark is to be created, wherein the bottom power is set to zero.

According to the method of recording information described above, the laser beam having the bottom power is actually turned off. This provides for only a rapid-cooling pulse to be reduced in power when the rapid-cooling pulse is generated during a cooling period of the record-mark creating process, i.e., during a period in which the light emitting device is driven with the bottom power. With this provision, record quality at high recording speed is improved without affecting the write power and the erase power.

According to at least one embodiment of the invention, the method as described above is configured such that the write power is responsive to a sum of a first electric current for generation of the laser beam having read power for reading information from the optical disc and a second electric current, the method further comprising a step of adjusting the write power by adjusting the first electric current in a stepwise manner.

In the method of recording information as described above, the read power that is generated by an electric current signal having small power and the high resolution of settings is adjusted in order to adjust the write power, thereby improving the resolution of settings of the write power that is used for recording. This provides sufficient emission power and the sufficient resolution of settings while achieving cost reduction.

According to at least one embodiment of the invention, a method of recording information on an optical disc includes the steps of shining a laser beam having write power on the optical disc at a portion where a mark is to be created, and shining a laser beam having first read power lower than the write power on the optical disc at a portion where a space is to be created, wherein the first read power is set to zero.

According to the method of recording information described above, the laser beam having the first read power is actually turned off during the recording operation. This provides for the consumption of an electric current to be eliminated at the position where a space is to be created, thereby reducing the consumption of an electric current during the recording process.

According to at least one embodiment of the invention, the method as described above is configured such that the write power is responsive to a sum of a first electric current for generation of second read power for reading information from the optical disc and a second electric current, the method further comprising a step of adjusting the write power by adjusting the first electric current in a stepwise manner.

In the method of recording information as described above, the second read power that is generated by an electric current signal having small power and the high resolution of settings is adjusted in order to adjust the write power, thereby improving the resolution of settings of the write power that is used for recording. This provides sufficient emission power and the sufficient resolution of settings while achieving cost reduction.

According to at least one embodiment of the invention, a method of recording information on an optical disc includes the steps of supplying, to a light emitting device, an electric current responsive to electric currents produced by respective electric current sources, causing the light emitting device to shine a laser beam having write power on the optical disc at a portion where a mark is to be created, causing the light emitting device to shine the laser beam having erase power lower than the write power on the optical disc at a portion where a space is to be created, and interchanging the electric current sources between an electric current source used for generation of the write power and an electric current source used for generation of the erase power.

In the method of recording information described above, channels are interchanged as such a need arises according to the required amounts of electric currents. The provision is thus made to broaden the range of power settings in response to the required amounts of electric currents even when each current source is designed for a predetermined specific usage.

According to at least one embodiment of the invention, the method as described above is such that the write power is responsive to a sum of a first electric current for generation of read power for reading information from the optical disc and a second electric current, the method further comprising a step of adjusting the write power by adjusting the first electric current in a stepwise manner.

In the method of recording information as described above, the read power that is generated by an electric current signal having small power and the high resolution of settings is adjusted in order to adjust the write power, thereby improving the resolution of settings of the write power that is used for recording. This provides sufficient emission power and the sufficient resolution of settings while achieving cost reduction.

According to at least one embodiment of the invention, an apparatus for driving a light source that emits a laser beam shone on an optical disc includes an electric-current-signal source unit configured to output at least three electric current signals, and a drive-signal generating unit configured to combine the at least three electric current signals into a single drive signal that causes the light source to emit the laser beam having highest power among all pulses of the laser beam used for recording information on the optical disc.

In the apparatus for driving the light source as described above, the signal levels of the electric current signals do not have to be raised even when the drive signal for causing the light source to generate the highest power is increased in response to an increase in recording speed. This is because an increased number of electric current signals are combined. Because of this, inexpensive articles of commodity available through mass production can be properly used as electrical/electronic components of the apparatus for driving the light source while preventing a signal delay affecting record quality from occurring in the drive signal. Namely, the drive signal corresponding to the write signal is properly generated with sufficient precision even at high recording speed. This makes it possible to maintain optimum emission power at high recording speed without incurring a cost increase.

According to at least one embodiment of the invention, the apparatus as described above is configured to drive the light source for recording and reproducing information on and from the optical disc that is a rewritable optical disc, wherein the at least three electric current signals include a first electric current signal, a second electric current signal, and a third electric current signal, the first electric current signal having a signal level smaller than a threshold current level at which the power of the laser beam as a function of an electric current supplied to the light source exhibits a steep rise from a proximity of zero power, the second electric current signal having a signal level substantially equal to a difference between a signal level corresponding to write power and a signal level corresponding to erase power, and the third electric current signal having a signal level substantially equal to a difference between a signal level corresponding to the erase power and the signal level of the first electric current signal.

According to at least one embodiment of the invention, the apparatus as described above is configured such that the electric-current-signal source unit further outputs a fourth electric current signal that is set to a signal level corresponding to base power, and the drive-signal generating unit generates a drive signal responsive to the fourth electric current signal to cause the light source to emit the laser beam for reproducing information from the optical disc.

According to at least one embodiment of the invention, the apparatus as described above is configured such that the drive-signal generating unit is configured to select either one of the first electric current signal and the fourth electric current signal in response to a write-gate signal. This makes it possible to achieve the sharing of a circuit portion, thereby providing cost reduction as well as size reduction.

According to at least one embodiment of the invention, the apparatus as described above is configured to drive the light source for recording and reproducing information on and from the optical disc that is the rewritable optical disc, which complies with one of a CD-RW standard, a DVD-RW standard, and a DVD+RW standard.

According to at least one embodiment of the invention, the apparatus as described above is configured to drive the light source for recording and reproducing information on and from the optical disc that is a write-once optical disc, wherein the at least three electric current signals include a first electric current signal, a second electric current signal, and a third electric current signal, the first electric current signal having a signal level substantially equal to a signal level corresponding to read power, the third electric current signal having a signal level substantially equal to a difference between the signal level of the first electric current signal and a signal level corresponding to middle power situated between the read power and write power, and the second electric current signal having a signal level substantially equal to a difference between a signal level corresponding to the write power and the signal level corresponding to the middle power.

According to at least one embodiment of the invention, the apparatus as described above is configured to drive the light source for recording and reproducing information on and from the optical disc that is the write-once optical disc, which complies with one of a CD-R standard, a DVD-R standard, and a DVD+R standard.

According to at least one embodiment of the invention, the apparatus as described above further includes an electric-current-signal adjusting unit configured to adjust the first electric current signal and the second electric current signal in response to a monitor signal indicative of the power of the laser beam.

According to at least one embodiment of the invention, an optical disc apparatus for recording information on an optical disc includes a light source configured to emit a laser beam shone on the optical disc, an electric-current-signal source unit configured to output at least three electric current signals, a drive-signal generating unit configured to combine the at least three electric current signals into a single drive signal that causes the light source to emit the laser beam having highest power among all pulses of the laser beam used for recording information on the optical disc, and a recording unit configured to control the electric-current-signal source unit and the drive-signal generating unit to record information on the optical disc.

BRIEF DESCRIPTION OF THE DRAWINGS

Other objects and further features of the present invention will be apparent from the following detailed description when read in conjunction with the accompanying drawings, in which:

FIG. 4 is a timing chart showing the relationship between write pulses and the power of light emission of the laser diode at the time of recording on the optical disc that is a CD-RW disc;

FIG. 5 is a timing chart showing the relationship between write pulses and the power of light emission of the laser diode at the time of recording on the optical disc that is a CD-R disc according to another embodiment of the invention;

DESCRIPTION OF THE PREFERRED EMBODIMENTS

In the following, embodiments of the present invention will be described with reference to the accompanying drawings.

Figure 1:
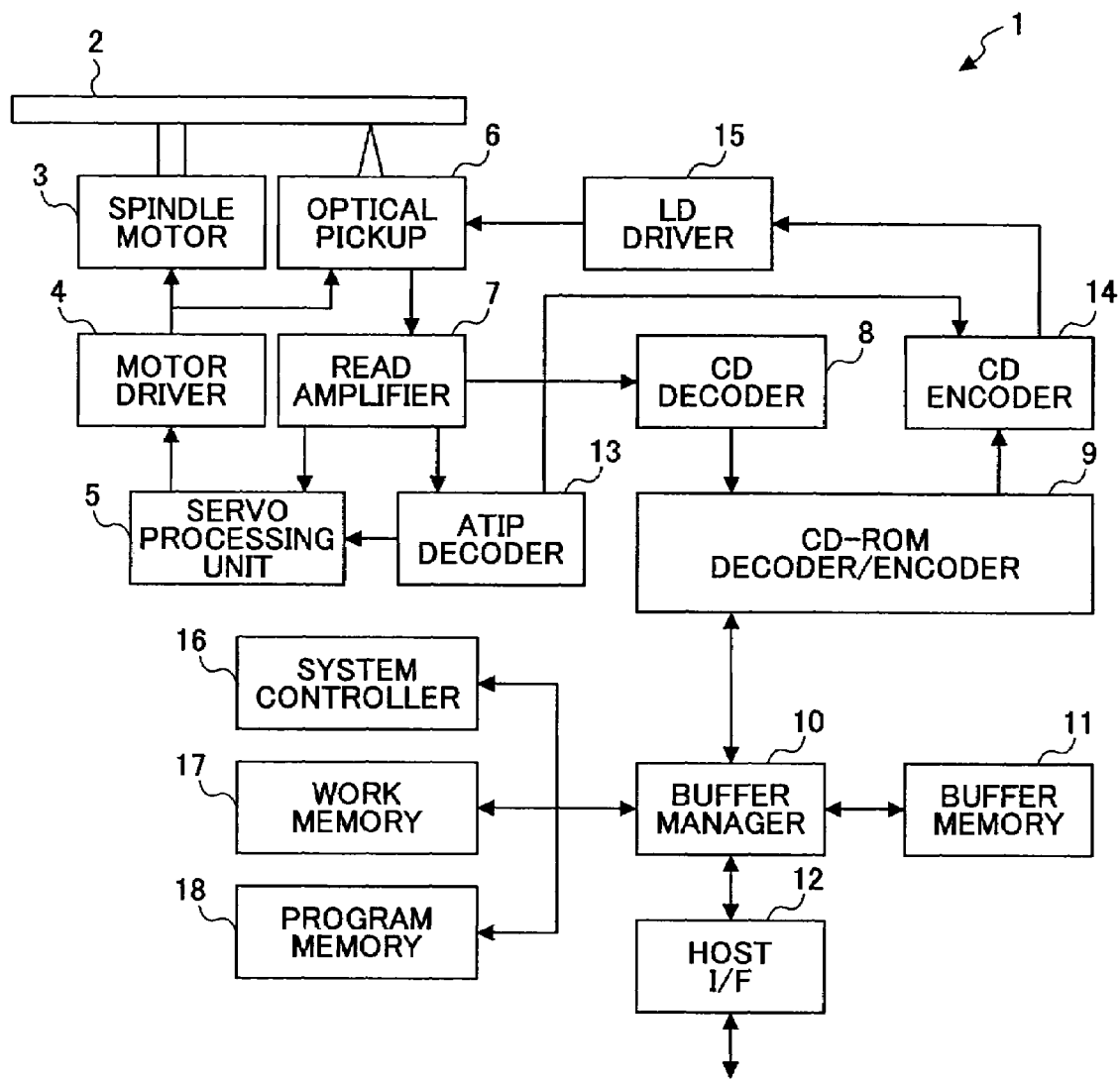
FIG. 1 is a block diagram showing an optical disc apparatus according to an embodiment of the present invention.

FIG. 1 is a block diagram showing an optical disc apparatus according to an embodiment of the present invention. An optical disc apparatus 1 includes a spindle motor 3 serving as a revolving unit for revolving an optical disc 2. The spindle motor 3 is controlled by a motor driver 4 and a servo processing unit 5 so as to provide a constant linear velocity or a constant angular velocity. In the optical disc apparatus 1 of this embodiment, the linear velocity or the angular velocity may be adjustable in a stepwise manner.

The optical disc apparatus 1 includes an optical pickup 6 for shining a laser beam on the optical disc 2. The optical pickup 6 includes a semiconductor laser (LD in FIG. 2), an optical system, a focus actuator, a track actuator, a light receiving device, a position sensor, etc., which are known technology, and the description and illustration thereof will be omitted. The optical pickup 6 further includes a seek motor (not shown) for shifting the optical pickup 6. The focus actuator, track actuator, and seek motor of the optical pickup 6 of the optical disc apparatus 1 are controlled by the motor driver and the servo processing in response to signals supplied from the light receiving device and the position sensor. This control makes it possible to move a laser spot to a desired position.

When information recorded on the optical disc 2 is to be read, a reproduced signal obtained by the optical pickup 6 is amplified by a read amplifier 7 for binarization, and is then supplied to a CD decoder 8 for data interleaving and error correction. The data is then supplied to a CD-ROM decoder/encoder 9 for further error correction, which is performed for the purpose of reliability enhancement. The error corrected data is temporarily stored in a buffer memory 11 by a buffer manager 10. When all data items for sector data are prepared, the data is transmitted to a host device (not shown) at once via a host I/F 12 such as an ATAPI or an SCSI interface. With this provision, a reproduction unit is implemented.

When information is to be recorded (written) on the optical disc 2, the host device supplies data through the host I/F 12 such as an ATAPI or an SCSI interface. The supplied data is temporarily stored in the buffer memory 11 by the buffer manager 10. When a certain amount of data is accumulated in the buffer memory 11, a write operation starts.

Prior to the start of the write operation, however, the laser spot needs to be repositioned at a point where writing starts. This write start position may be determined based on a wobble signal recorded in advance as a track wobbling on the optical disc. The wobble signal includes information indicative of an absolute time (called ATIP), which is extracted by an ATIP decoder 13. The ATIP decoder 13 generates a synchronizing signal, and supplies this signal to a CD encoder 14. This achieves data writing at a correct position with accuracy.

The data stored in the buffer memory 11 is then subjected to the insertion of error correction codes and interleaving by the CD-ROM decoder/encoder 9 and the CD encoder 14. After this, the data is recorded on the optical disc 2 via an LD driver 15 and the optical pickup 6. With this provision, a recording unit is implemented.

A system controller (CPU) 16 of the optical disc apparatus 1 performs a series of control processes required for the read and write operations. The system controller 16 is connected to a work memory 17 and a program memory 18 via a bus.

The work memory 17 stores stack information and variables at the time of program execution.

The program memory 18 mainly stores programs for the system controller. These stored programs includes a rewriting program for updating a firmware, a program for reading and writing information from and to the optical disc 2, etc.

The system controller 16 can access the buffer memory 11 through the buffer manager 10. The buffer memory 11 stores read data and write data for the optical disc 2. The system controller 16 accesses the buffer memory 11 to extract or attach header information and sub-code information. The header information and the sub-code information are well known in the art, and a description thereof will be omitted.

Figure 2:
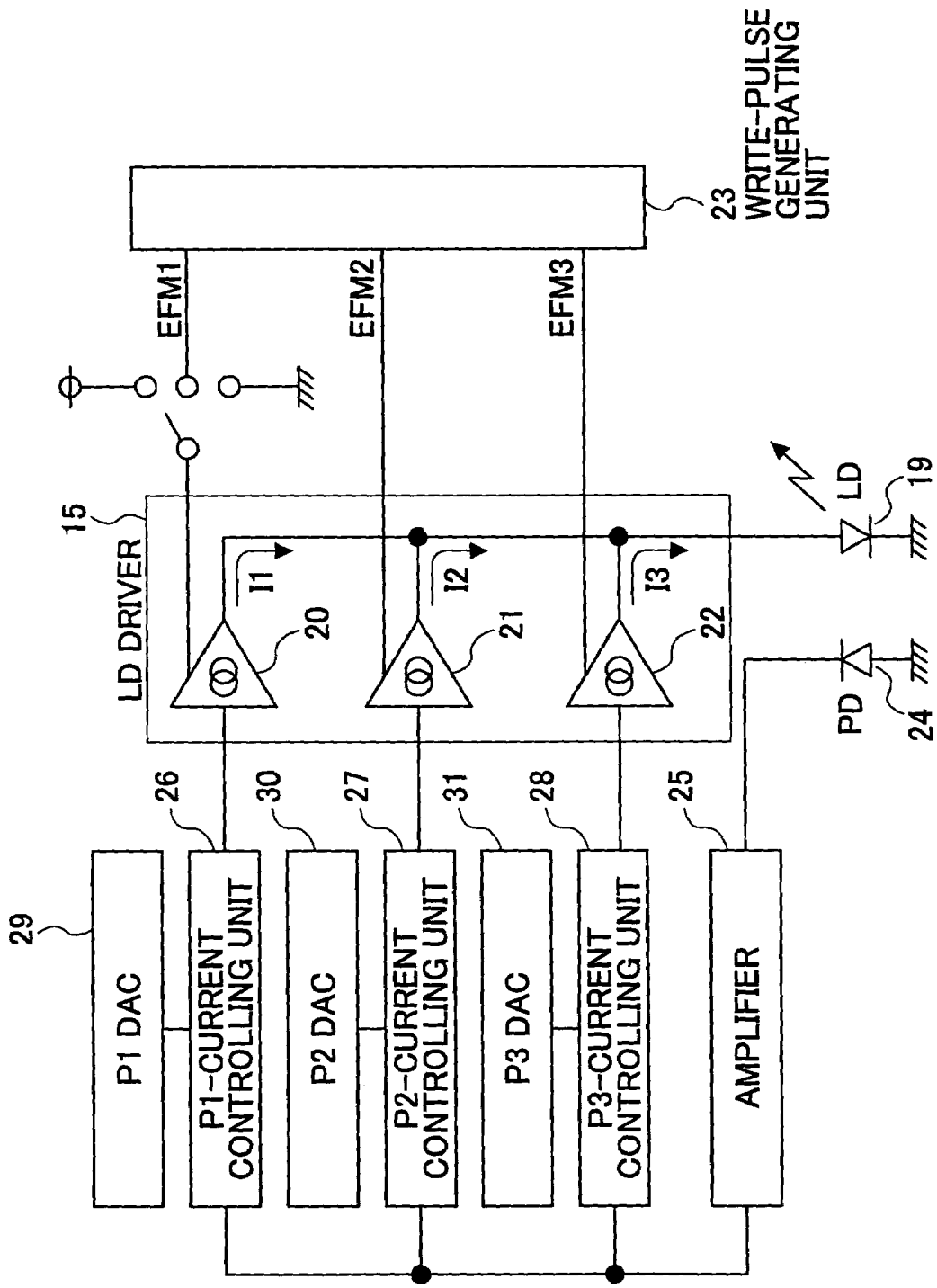
FIG. 2 is a block diagram showing the further detail of a portion around an LD driver of FIG. 1 with a focus on LD control.

In the following, a description will be given of the LD driver 15 and its surrounding mechanisms with a focus on LD (laser diode) control by the optical pickup 6. FIG. 2 is a block diagram showing the further detail of a portion around the LD driver 15 of FIG. 1 with a focus on LD control. The LD driver 15 controls the on/off operation of a laser diode (LD) 19 serving as a light emitting device of the optical pickup 6, and includes 3-channel current amplifiers 20, 21, and 22. The LD driver 15 amplifies currents supplied to the respective current amplifiers 20, 21, and 22 by predetermined respective amplification factors, and drives the laser diode 19 of the optical pickup 6 with the sum of the amplified currents.

The current amplifiers 20, 21, and 22 are capable of turning on/off their output currents at high speed. Signals EFM1, EFM2, and EFM3 supplied from a write-pulse generating unit 23 control the current amplifiers 20, 21, and 22, respectively.

A signal for switching on/off an electric current supplied within the range of I1 (hereinafter referred to as a current I1) is selected from a signal for permanent ON, a signal for permanent OFF, and the signal EFM1. The current I1 is switched between ON and OFF when turning off the LD or turning on the LD for the reproduction of the optical disc 2.

A photo detector (PD) 24 is a detector provided for the purpose of causing the laser diode 19 to glow with desired power. An electric current running through the photo detector 24 varies in response to the amount of light emission of the laser diode 19. The current of the photo detector 24 is converted into a voltage by an I/V converter (not shown), and is then amplified by an amplifier 25. The amplified signal is supplied to a P1-current controlling unit 26, a P2-current controlling unit 27, and a P3-current controlling unit 28. The current controlling units 26, 27, and 28 are connected to a P1 DAC (DA converter) 29, a P2 DAC 30, and a P3 DAC 31.

The P1-current controlling unit 26, the P2-current controlling unit 27, and the P3-current controlling unit 28 sample and hold the PD signal as such a need arises, thereby obtaining the light emission power of the laser diode 19, followed by comparing this light emission power with predetermined target power. Electric currents are then supplied to the LD driver 15 such as to attain the target power.

Figure 3:
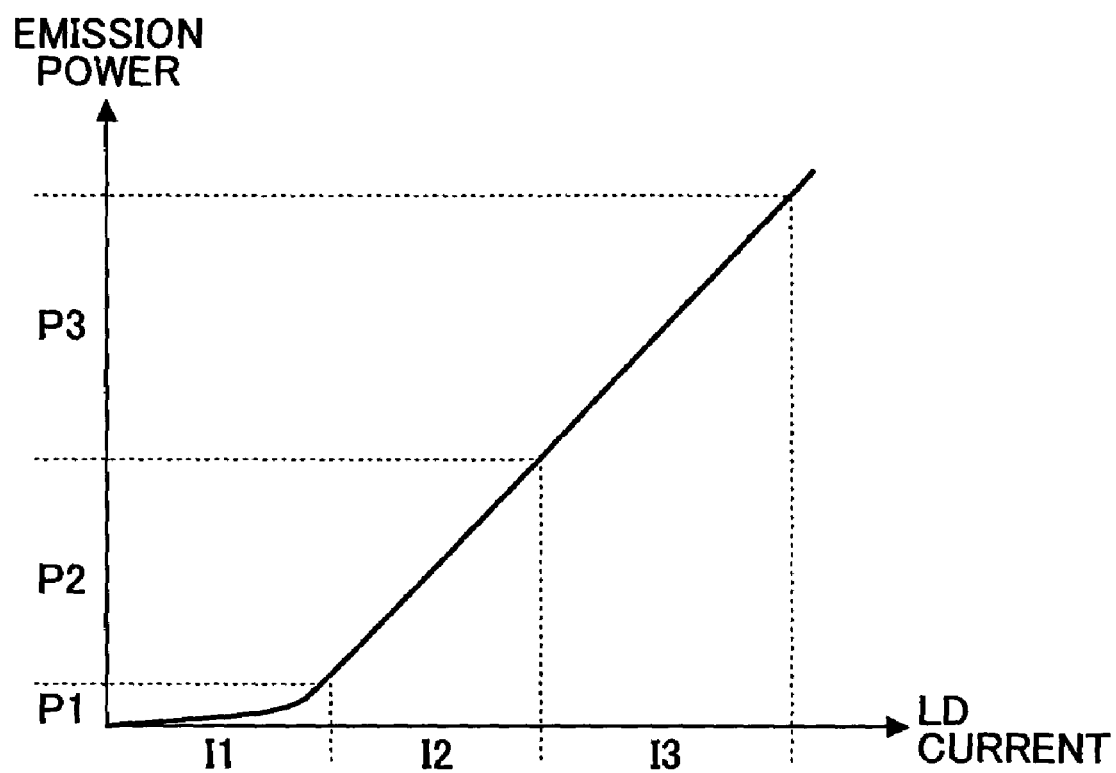
FIG. 3 is a diagram showing the relationship between an electric current and the power of light emission of a laser diode.

FIG. 3 is a diagram showing the relationship between an electric current and the power of light emission of the laser diode 19. As can be seen from FIG. 3, there is a region of an electric current in the laser diode 19 in which the amount of light emission does not show a significant increase in relation to an increase in the electric current until a certain amount of current is provided. Because of this, even when low power such as emission power P1 is used, for example, a significant amount of current such as shown in the range of the current I1 is necessary.

The power of light emission required for recording is generated by adding an electric current within the range of I2 (hereinafter referred to as a current I2) and an electric current within the range of I3 (hereinafter referred to as a current I3) to the base current I1. This method is advantageous in that the maximum current of each channel is kept at a low level, and in that easy control is achieved by adjusting write power by use of a region where the power of light emission is proportional to the LD current.

FIG. 4 is a timing chart showing the relationship between write pulses and the power of light emission of the laser diode 19 at the time of recording on the optical disc 2 that is a CD-RW disc. In FIG. 4, "EFM" represents the EFM data of data to be recorded. A HIGH pulse is used to record a mark, and a LOW pulse is used to record a space. Further, "WG" represents a write-gate signal indicating that recording is underway. Further, "EFM1", "EFM2", and "EFM3" are signals for turning on/off the channel currents of the LD driver. The EFM1 signal turns on/off the current I1, the EFM2 signal the current I2, and the EFM3 signal the current I3.

Although each period is illustrated with a break halfway through, a period A in FIG. 4 shows the relationship between the write pulses at the start of recording and the power of light emission of the laser diode 19, and a period B shows the relationship between the write pulses during the time of ongoing recording and the power of light emission of the laser diode 19. Further, a period C shows the relationship between the write pulses at the end of recording and the power of light emission of the laser diode 19.

The write-gate signal WG is LOW prior to the start of recording and after the end of recording. During the period in which the write-gate signal WG is LOW, the signal EFM1 is HIGH. During such period, the power of light emission of the laser diode 19 is equal to the bottom power Pb generated by the current I1. Here, the bottom power Pb is equal to the power P1.

During the time of ongoing recording of a mark, a period during which the signals EFM1, EFM2, and EFM3 are all HIGH and a period during which the signals EFM1, EFM2, and EFM3 are all LOW are repeated one after another. As a result, the power of light emission of the laser diode 19 is controlled such that the write power alternates between PW (=P1+P2+P3) generated by the sum of I1, I2, and I3 and P0 (no light emission) corresponding to no current.

During the time of ongoing recording of a space, the signals EFM1 and EFM2 are HIGH, and the signal EFM3 is LOW. As a result, the power of light emission of the laser diode 19 is controlled such that the erase power becomes Pe (=P1+P2) generated by the sum of I1 and I2.

In the laser diode 19, a power margin tends to decrease as recording speed improves with respect to the optical disc 2 when the optical disc 2 is a CD-RW disc. It is confirmed that where the recording speed is improved and record quality is not sufficient, the lower the power of pulses for sudden cooling, the better the record quality is.

If the erase power Pe is excessively lowered in the region where a linear relationship disappears between an electric current and the power of light emission in the laser diode 19, a problem is encountered when selecting the erase power Pe and the write power Pw.

In the present embodiment, however, it is only a cooling period during which the current I1 is turned off in addition to the currents I2 and I3. This achieves zero bottom power Pb only during the cooling period, thereby improving record quality at high-speed recording.

In the following, another embodiment of the invention will be described with reference to FIG. 5. In FIG. 5, the same elements as those of the previous embodiment are referred to by the same numerals, and a description thereof will be omitted.

FIG. 5 is a timing chart showing the relationship between write pulses and the power of light emission of the laser diode 19 at the time of recording on the optical disc 2 that is a CD-R disc in the optical disc apparatus 1 according to another embodiment of the invention. In FIG. 5, "EFM", "WG", "EFM1", "EFM2", and "EFM3" are the same as those of FIG. 4. Further, the periods A through C are the same as those of FIG. 4.

In this embodiment, the write-gate signal WG is LOW prior to the start of recording and after the end of recording. During the period in which the write-gate signal WG is LOW, the power of light emission of the laser diode 19 is adjusted to the read power Pr (=P1) by use of the current supplied within the range of I1 if only the signal EFM1 is HIGH.

During the time of ongoing recording of a mark, the signals EFM1, EFM2, and EFM3 are all set to HIGH immediately after the start of recording. As a result, the power of light emission of the laser diode 19 is adjusted to Pp (=P1+P2+P3) generated by the sum of the currents I1, I2, and I3. In the present embodiment, a pulse comprised of the power of LD light emission equal to Pp (=P1+P2+P3) is treated as a peak pulse.

It should be noted that, in general, such a peak pulse is regarded as serving to improve pit formation, but may possibly be unnecessary depending on the type of medium.

Thereafter, when the signals EFM1 and EFM2 are HIGH and the signal EFM3 is LOW, the power of LD light emission adjusted to Pw (=P1+P2) generated by the sum of the currents I1 and I2.

When a CD-R disc is used as the optical disc 2, light is conventionally emitted with power Pr at the position of a space even through no process is performed on the record film at the position of a space. In the present embodiment, on the other hand, the signals EFM1, EFM2, and EFM3 are all set to LOW, thereby turning off the LD with no current provided at the position of a space.

In recent years, many notebook-type personal computers have been equipped with a CD-R drive. Since notebook-type personal computers are typically driven by use of a buttery, the CD-R drive (optical disc apparatus 1) provided as a peripheral needs to be designed to run with small power.

Conventionally, pits are crated by severing a record film by heat when recording data on the optical disc 2 that is a CD-R disc. To this end, the CD-R drive shines a laser beam having the read power Pr on the portion where a space is to be created, and shines a laser beam having the write power Pw on the portion where a mark is to be created.

Since no process is performed on the record film at the portion where a space is to be created, the use of the read power Pr having zero power is believed to cause no trouble when recording information. Conventionally, however, the laser source was driven to glow with the read power Pr, resulting in the consumption of a large current as shown in FIG. 3 even though the read power Pr is small.

In the present embodiment, the read power Pr is set to zero, thereby turning off the laser light during the period in which a scan is performed over the portion where a space is to be formed. This eliminates the consumption of an electric current for the portion where a space is to be formed, resulting in the reduction of current consumption required for recording.

Figure 6:
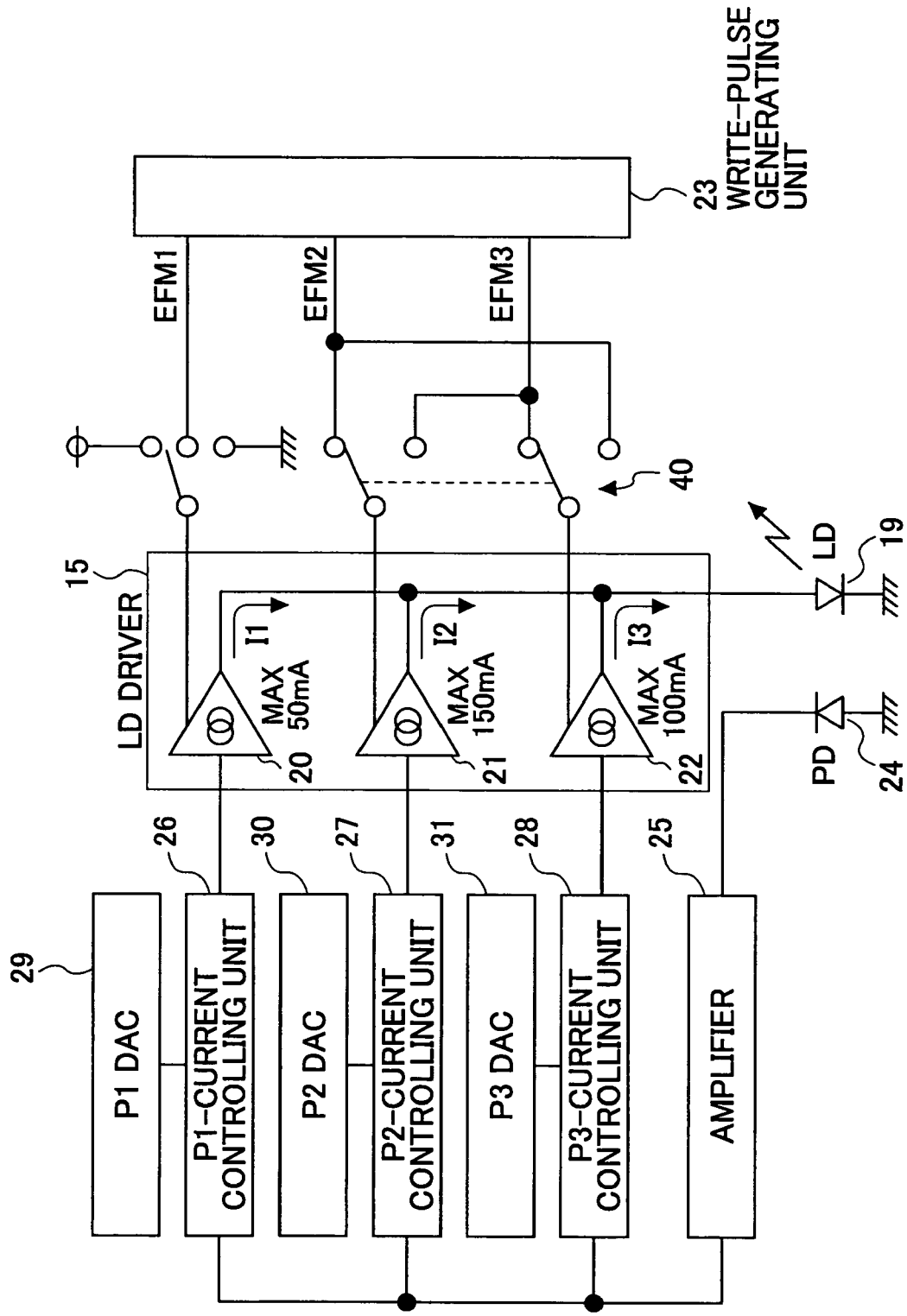
FIG. 6 is a block diagram showing the further detail of a portion around the LD driver of the drive apparatus according to yet another embodiment of the invention with a focus on the control of the laser diode.

In the following, yet another embodiment of the invention will be described with reference to FIG. 6. FIG. 6 is a block diagram showing the further detail of a portion around the LD driver 15 of the drive apparatus according to yet another embodiment of the invention with a focus on the control of the laser diode 19. As shown in FIG. 6, the present embodiment provides a switch unit 40, which serves as a current-source setting means for selecting which one of the signals EFM2 and EFM 3 turns on/off which one of the currents I2 and I3, respectively.

In the present embodiment, the maximum tolerable current is assumed to be 50 mA for the current I1, 150 mA for the current I2, and 100 mA for the current I3.

A large number of existing laser drivers have maximum tolerable electric currents that are different for respective channels. Each channel has its specific usage such as the read purpose or the write purpose, and the design of an electric current is made to conform to the respective usages such as a maximum tolerable current of 50 mA for channel 1, a maximum tolerable current of 150 mA for channel 2, and a maximum tolerable current of 100 mA for channel 3. In the case of a CD-R medium used as the optical disc 2, for example, the channel 1 is used for producing read power, the channel 2 for producing write power, and the channel 3 for producing peak power. In the case of CD-RW used as the optical disc 2, for example, the channel 1 is used for producing base power, the channel 2 for producing erase power, and the channel 3 for producing write power. In this manner, respective usages are determined in advance.

Conventionally, the recording speed of a CD-RW medium used as the optical disc 2 is slower than the recording speed of a CD-R medium used as the optical disc 2. Because of this, the recording power would never be perceived as lacking sufficient power.

The recording speed of CD-R media used as the optical disc 2, however, has recently been reaching its maximum limit, whereas the recording speed of CD-RW media used as the optical disc 2 is still increasing. This gives rise to a problem in that sufficient record power cannot be attained for the recording of CD-RW media used as the optical disc 2. For example, a current of 80 mA may be necessary as the erase power, and a current of 120 mA may be necessary as the write power. In such a case, a problem may be encountered in that the current of the channel 3 exceeds its tolerable current limit.

In order to improve the record quality of CD-RW media, the level of the erase power Pe may need to be lowered while maintaining the level of the write power Pw. In such a case, the ratio of the power P3 increases, and may exceed the 100-mA limit.

In such a case, the present embodiment uses the signal EFM3 to turn on/off the current I2, and uses the signal EFM2 to turn on/off the current I3. That is, switching is made such that the currents of the channels of the LD driver 15 do not exceed the respective tolerable limits when the power P2 and the power P3 are set to the required levels. This provides for the range of power settings to be broadened.

Figure 7:
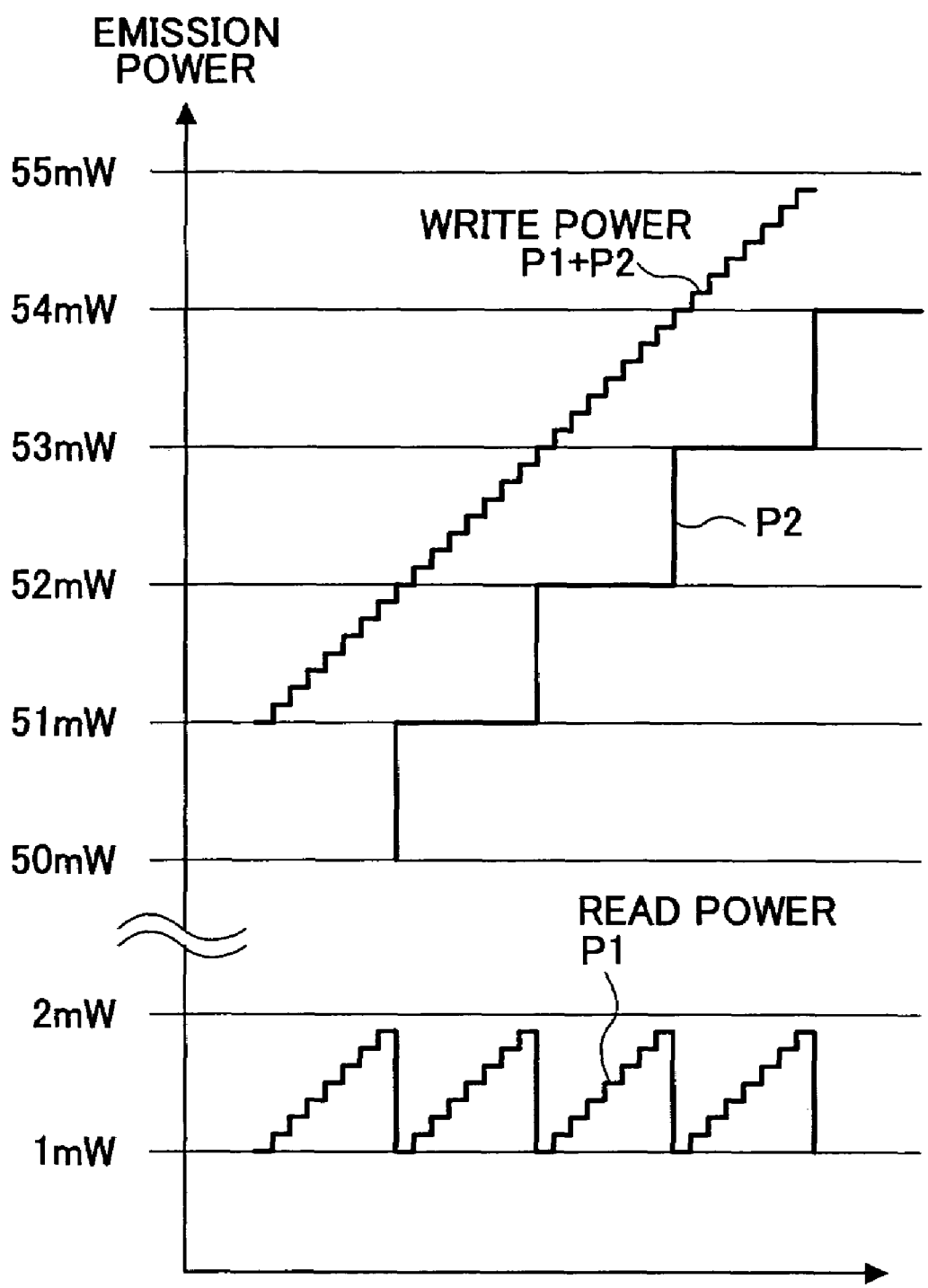
FIG. 7 is a diagram showing the relationship between the power of light emission of the laser diode and an increase in the power of light emission in the optical disc apparatus according to still another embodiment of the invention.

In the following, still another embodiment of the present invention will be described with reference to FIG. 7. FIG. 7 is a diagram showing the relationship between the power of light emission of the laser diode 19 and an increase in the power of light emission in the optical disc apparatus 1 according to still another embodiment of the invention. In FIG. 7, the horizontal axis represents settings made for increasing the power of light emission of the laser diode 19, and the vertical axis represents the actual power of light emission.

In the present embodiment, the power P1 used as the read power is settable in increments of 0.1 mW, and the power P2 is settable in increments of 1 mW. At the beginning, the power P1 is set to 1 mW, and the power P2 is set to 50 mW. The write power P1+P2 is thus 51 mW.

From this initial setting, the power P1 is increased by increments of 0.1 mW, resulting in the power P1+P2 increasing by increments of 0.1 mW. The power P1 is set to 1 mW again after 1.9 mW, and the power P2 is changed to 51 mW. This creates the power P1+P2 that is 52 mW.

In this manner, the read power Pq that is equal to the power P1 is changed in such a fashion as to interpolate for the setting of the power P2. This makes it possible to set the write power P1+P2 with precision by increments of 0.1 mW. This provision attains a read power setting means.

It should be noted that a limited change in the read power does not affect servo operations or record quality.

With the provision described above, the power P1+P2 is adjusted with precision by utilizing the power P1 having the small maximum power and the high resolution of settings and the power P2 having the large maximum power and the low resolution of settings. That is, the write power is adjustable with the prevision of settings of the read power, thereby achieving cost reduction with respect to the optical disc apparatus 1.

In the following, a second aspect of the invention will be described.

With the development of digital technologies and the improvement of data-compression technologies in recent years, CDs (compact discs) and DVDs (digital versatile discs) have been attracting attention as record media for recording information (contents) such as music, pictures, and computer software. Due to reduction in the price of such media, optical disc apparatuses for using optical discs as information recording media have also become widely used.

In optical disc apparatuses, a light source emits a laser beam to form a small spot on a recording surface of an optical disc where a track or tracks are formed in spiral shape or in concentric circles. The small spot is used to record or erase information, and is also used to reproduce information based on reflective light returning from the recording surface.

On an optical disc, a mark portion and a space portion have respective reflective indexes, and the varying length and combination of these portions represent recorded information. When information is to be recorded on an optical disc, the power of a laser beam emitted from the light source is controlled such as to create mark portions and space portions having desired lengths at desired positions.

Write-once optical discs such as CD-R (CD-Recordable), DVD-R (DVD-Recordable), and DVD+R (DEV+Recordable) have organic dye coating on the record surface. When a mark is to be formed, the large power of light emission is used to heat and melt the dye, thereby transforming/deforming a disc base at that position. When a space is to be formed, the power of light emission is maintained at approximately the same level as in the reproduction operation so as to avoid transformation/deformation of the disc base. This creates a mark portion having a lower reflective index than a space portion. Such control of emission power is referred to as a single-pulse recording method. The emission power for use in crating a mark is called write power. The emission power for use in reproducing information is called read power. Inevitably, the read power is lower than the write power.

Rewritable optical discs such as CD-RW (CD-Rewritable), DVD-RW (DVD-Rewritable), and DVD+RW (DEV+Rewritable) have special alloy on the recording surface. When a mark is to be created, the special alloy is heated to a first temperature and then rapidly cooled, thereby turning into an amorphous state. When a space is to be formed, the special alloy is heated to a second temperature lower than the first temperature and then gradually cooled, thereby turning into a crystalline state. As a result, a mark portion has a lower reflective index than a space portion.

Such temperature control of the special alloy is achieved by controlling the emission power of a laser beam. Further, in order to remove an effect of heat accumulation, the emission power for creating a mark is divided into a plurality of pulses (multi-pulses). This method of controlling emission power is referred to as a multi-pulse recording method. The peak value of emission power of multi-pulses is referred to as heating power (or write power), and the bottom value thereof is referred to as cooling power (or bottom power). A pulse having the heating power is called a heating pulse, and a pulse having the cooling power is called a cooling pulse. Further, the emission power for use in creating a space is called erase power. The heating power is greater than the erase power, which is greater than the cooling power.

Since emission power greatly affects record quality, there are various apparatuses that are proposed for the purpose of controlling emission power with sufficient precision (e.g., Japanese Patent Application Publications No. 2001-344752, No. 2002-298417, No. 2002-334433, and No. 2002-57403).

A light source such as a semiconductor laser typically used in an optical disc apparatus is a current-driven type. That is, the emission power of such a light source is controlled by an electric current (drive current) supplied from a driver. The relationship between the amount of a drive current and emission power is generally referred to as an I-L characteristic.

In the case of a write-once optical disc, for example, two types of electric current signals are input into the driver for the purpose of controlling emission power. One is an electric current signal (referred to as a current signal A) having a signal level corresponding to the read power. The other is an electric current signal (referred to as a current signal B) having a signal level corresponding to a difference between the write power and the read power. The driver supplies a drive current by using only the current signal A when the read power is required. The driver supplies a drive current by using the sum of the current signal A and the current signal B when the write power is required. This ensures that a transition from the read power to the write power and from the write power to the read power is smoothly made.

In the case of rewritable optical disc, when controlling emission power for creating a mark, the driver receives an electric current signal (referred to as a current signal X) having a signal level corresponding to the cooling power and an electric current signal (referred to as a current signal Y) having a signal level corresponding to a difference between the heating power and the cooling power. The driver supplies a drive current by using only the current signal X when the cooling power is required. The driver supplies a drive current by using the sum of the current signal X and the current signal Y when the heating power is required. This ensures that a transition from the cooling power to the heating power and from the heating power to the cooling power is smoothly made.

As the use of optical discs becomes commonplace, there is an increasing need for the further improvement of recording speed. At high recording speed, the mark portion and the space portion must be formed in a short time, resulting in a need for the rapid transition of emission power. When the write power (heating power) is increased to cope with the increase of recording speed, a difference between the write power and the read power and a difference between the heating power and the cooling power widen. If the power control circuit including the driver is implemented by use of commodity articles of mass production, a delay may occur in the transition of power due to signal delays inside the power control circuit. In such a case, jitters increase, resulting in the degradation of record quality.

In the apparatuses described in the four patent application publications identified above, electrical and electronic components such as operational amplifiers used in the power control circuit need to be changed to those of a high through rate in order to maintain proper record quality at high recording speed. Further, electrical and electronic components having a wide dynamic range and an electric current source producing a large current become necessary in order to cope with the greater write power (heating power). The use of such expensive electrical and electronic components may result in a cost increase.

Accordingly, there is a need for a light-source driving apparatus that can maintain optimum emission power at high recording speed without incurring a cost increase. Further, there is a need for an optical disc apparatus that can achieve stable, high-speed recording producing superior record quality.

In the following, embodiments of the second aspect of the invention will be described.

Figure 8:
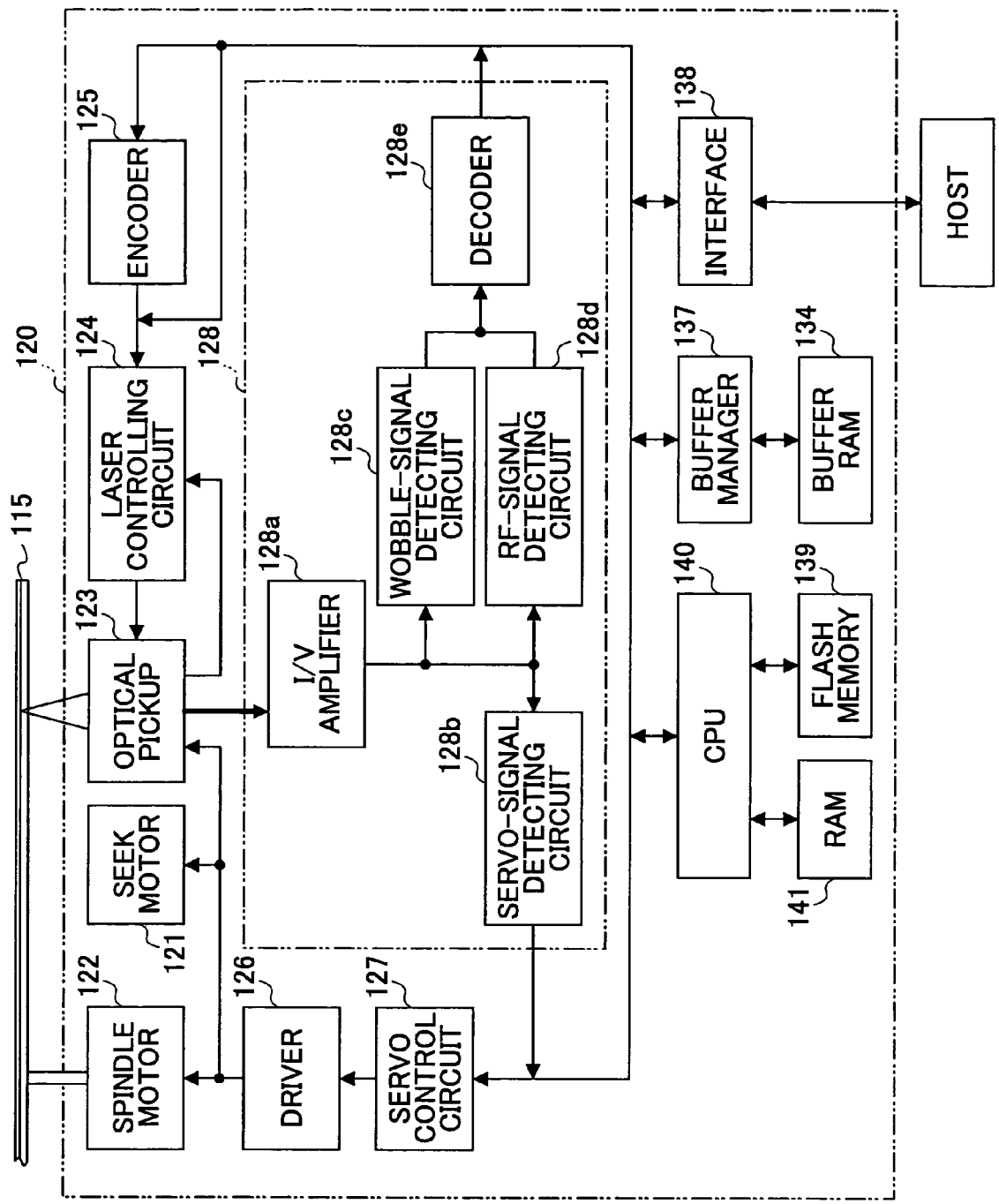
FIG. 8 is a block diagram showing the schematic construction of an optical disc apparatus according to an embodiment of the invention.

FIG. 8 is a block diagram showing the schematic construction of an optical disc apparatus 120 according to an embodiment of the invention.

The optical disc apparatus 120 of FIG. 1 includes a spindle motor 122 for revolving an optical disc 115, an optical pickup device 123, a seek motor 121 for shifting the optical pickup device 123 in a sledge direction, a laser controlling circuit 124, an encoder 125, a driver 126, a servo control circuit 127, a reproduced-signal processing circuit 128, a buffer RAM 134, a buffer manager 137, an interface 138, a flash memory 139, a CPU 140, and a RAM 141. In FIG. 8, arrows represent the flow of main signals and information, and are not indicative of all the connections between the illustrated blocks. In this embodiment, an information recording medium complying with the standard of CD-RW media is used as an example of the optical disc 115.

Figure 9:
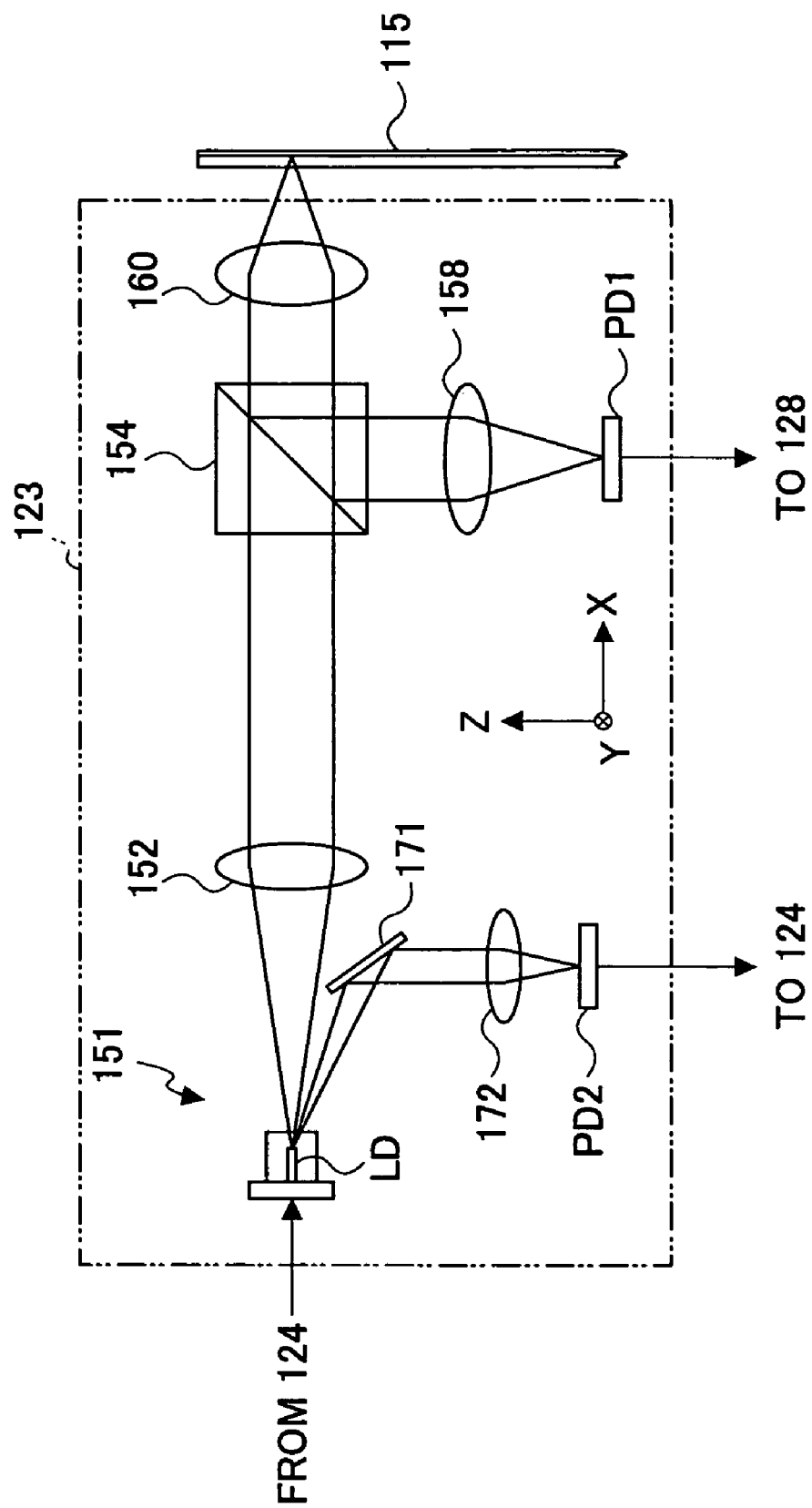
FIG. 9 is an illustrative drawing showing the construction of an optical pickup device shown in FIG. 8.

The write-pulse generating unit 23 shines a laser beam on the record surface of the optical disc 115 where a track or tracks are formed in spiral shape or in concentric circles, and receives reflective light returning from the record surface. As shown in FIG. 9 as a non-limiting example, the optical pickup device 123 includes a light source unit 151, a collimator lens 152, a beam splitter 154, an objective lens 160, two detection lenses 158 and 172, two light receiving devices PD1 and PD2, a reflective mirror 171, and a driving system (including a focus actuator and a tracking actuator, not shown).

The light source unit 151 is configured to include a semiconductor laser LD that serves as a light source for emitting a laser beam having a wavelength of 780 nm. In this embodiment, the laser beam emitted from the light source unit 151 has a maximum intensity in a +X direction. On a path extending from the light source unit 151 in the +X direction, the collimator lens 152 is provided to turn the light rays generated from the operation panel 51 into parallel rays.

The beam splitter 154 is situated to face the collimator lens 152 in the +X direction, and lets the light rays from the collimator lens 152 pass therethrough. The beam splitter 154 also splits the light rays (returning light rays) reflected by the record surface of the optical disc 115 to direct them in a –Z direction. The objective lens 160 is situated on a path extending from the beam splitter 154 in the +X direction, and condense the light rays on the record surface of the optical disc 115 after the light rays pass through the beam splitter 154.

The detection lens 158 is provided on a path extending from the beam splitter 154 in the –Z direction so as to condense the returning light rays on the light receiving surface of the light receiving device PD1 after the returning light rays are guided by the beam splitter 154 in the –Z direction. The light receiving device PD1 is configured to include a plurality of light receiving devices for outputting wobble signal information, reproduced data information, focus error information, track error information, etc. Each of the light receiving devices produces a signal responsive to the amount of received light by optoelectronic conversion, and supplies the signal to the reproduced-signal processing circuit 128.

The reflective mirror 171 is situated in the proximity of the collimator lens 152. The reflective mirror 171 reflects a portion of the light rays generated by the light source unit 151, and direct it in the –Z direction as a monitor-purpose light ray.

The detection lens 172 is situated on a path extending from the reflective mirror 171 in the –Z direction. The detection lens 172 condenses the monitor-purpose light ray reflected by the reflective mirror 171 in the –Z direction on the light receiving surface of the light receiving device PD2. As the light receiving device PD2, a normal light receiving device is used. The light receiving device PD2 produces a signal responsive to the amount of received light by optoelectronic conversion, and supplies the signal to the laser controlling circuit 124 as a monitor signal.

The focusing actuator (not shown) serves to shift the objective lens 160 by a minute amount in a focus direction (along the X axis in this example), which corresponds to an optical axis of the objective lens 160. The tracking actuator (not shown) serves to shift the objective lens 160 by a minute amount in a tracking direction (along the Z axis in this example), which is perpendicular to the tangent of a track.

With reference to FIG. 1 again, the reproduced-signal processing circuit 128 includes an I/V amplifier 128a, a servo-signal detecting circuit 128b, a wobble-signal detecting circuit 128c, a RF-signal detecting circuit 128d, and a decoder 128e.

The I/V amplifier 128a converts the output signals of the light receiving device PD1 into respective voltage signals, and amplifies the signals by predetermined gain factors.

The servo-signal detecting circuit 128b detects servo signals such as a focus error signal and a track error signal based on the output signals of the I/V amplifier 128a. The detected servo signals are supplied to the servo control circuit 127.

The wobble-signal detecting circuit 128c detects a wobble signal based on the output signals of the I/V amplifier 128a. The RF-signal detecting circuit 128d detects a RF signal based on the output signals of the I/V amplifier 128a. The decoder 128e extracts address information and synchronizing signals from the wobble signal. The extracted address information is supplied to the CPU 140, and the extracted synchronizing signals are supplied to the encoder 125. Further, the decoder 128e performs a decoding process and an error detecting process on the RF signal. The decoder 128e performs error correction if an error is detected, and stores the reproduced data in the buffer RAM 134 via the buffer manager 137.

The servo control circuit 127 generates a focus controlling signal for correcting focus error in response to the focus error signal, and generates a tracking controlling signal for correcting track error in response to the track error signal. Further, the servo control circuit 127 operates under the control of the CPU 140 to generate a spindle motor controlling signal for driving and controlling the spindle motor 122 and also to generate a seek motor controlling signal for driving and controlling the seek motor 121. These control signals are provided to the driver 126.

The driver 126 supplies the optical pickup device 123 with a signal for driving the focusing actuator in accordance with the focus controlling signal and a signal for driving the tracking actuator in accordance with the tracking controlling signal. With this provision, tracking control and focus control are performed. Further, the driver 126 supplies the spindle motor 122 with a drive signal responsive to the spindle motor controlling signal, and also provides the seek motor 121 with a drive signal responsive to the seek motor controlling signal.

The buffer RAM 134 temporarily stores data (record-purpose data) to be recorded on the optical disc 115 and data (reproduced data) reproduced from the optical disc 115. The inputting/outputting of data into/from the buffer RAM 134 is controlled by the buffer manager 137.

The encoder 125 responds to an instruction from the CPU 140 to extract the record-purpose data stored in the buffer RAM 134 by use of the buffer manager 137, followed by modulating the data, attaching error correction codes, etc., thereby generating a write signal with respect to the optical disc 115. The generated write signal is supplied to the laser controlling circuit 124.

The laser controlling circuit 124 controls the power of laser light emitted by the semiconductor laser LD. The detail of the laser controlling circuit 124 will be described later.

The interface 138 is a two-way communication interface with a host device (e.g., personal computer). The interface 138 complies with the interface standard such as ATAPI (AT Attachment Packet Interface) or SCSI (Small Computer System Interface).

The flash memory 139 stores programs written in the codes decodable by the CPU 140, recording conditions inclusive of recording strategy information, etc. The flash memory 139 also stores the relationship between the amount (I) of an electric current supplied to the semiconductor laser LD and the emission power (L) of the semiconductor laser LD (see FIGS. 11A through 11D). This relationship is I-L characteristics (hereinafter sometimes referred to as glow characteristics).

The CPU 140 controls the units described above according to the programs stored in the flash memory 139, and, also, stores data required for such control in the RAM 141.

In the following, a description will be given of the laser controlling circuit 124.

Figure 10:
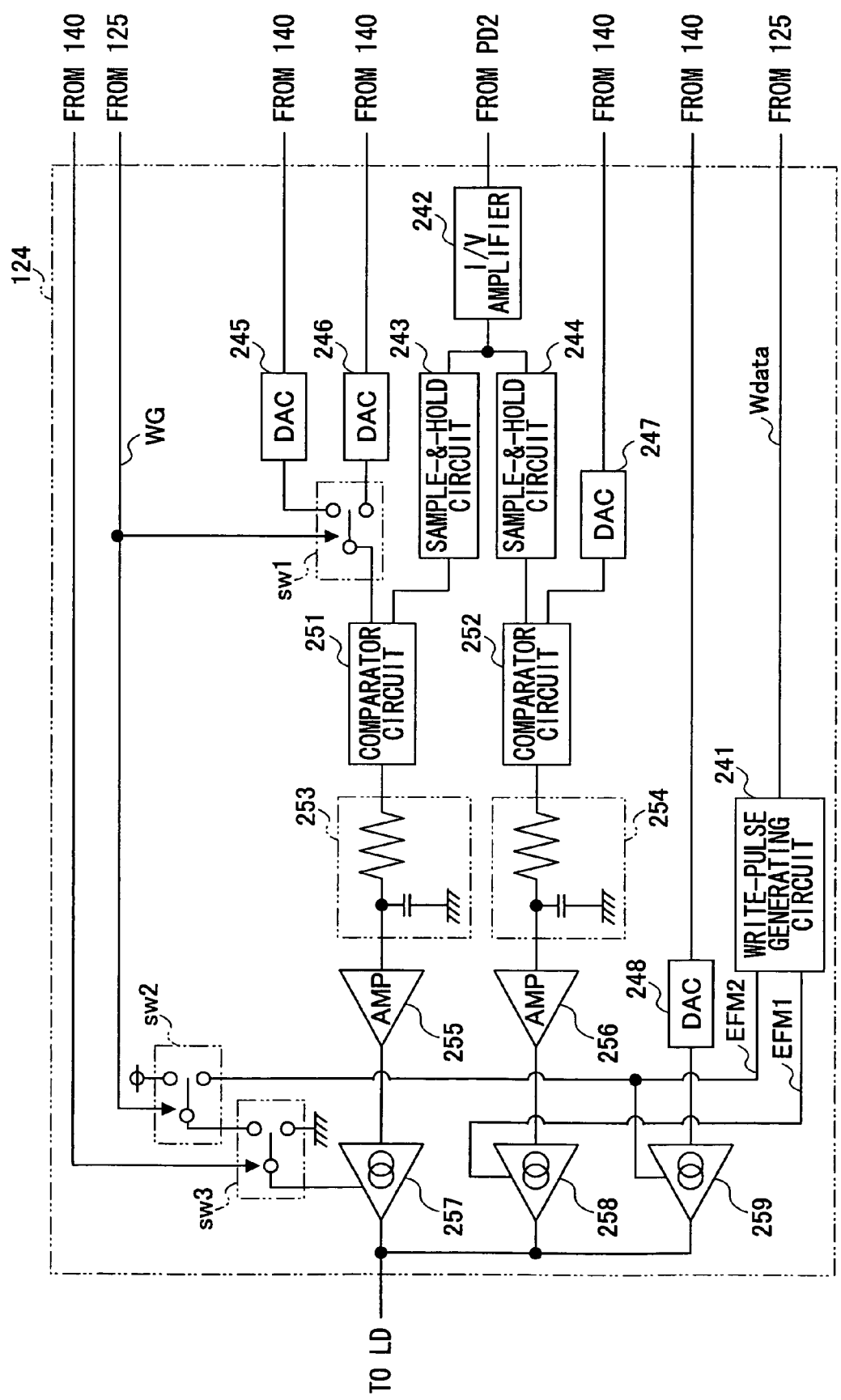
FIG. 10 is an illustrative drawing showing the construction of a laser controlling circuit shown in FIG. 8.
Figure 12:
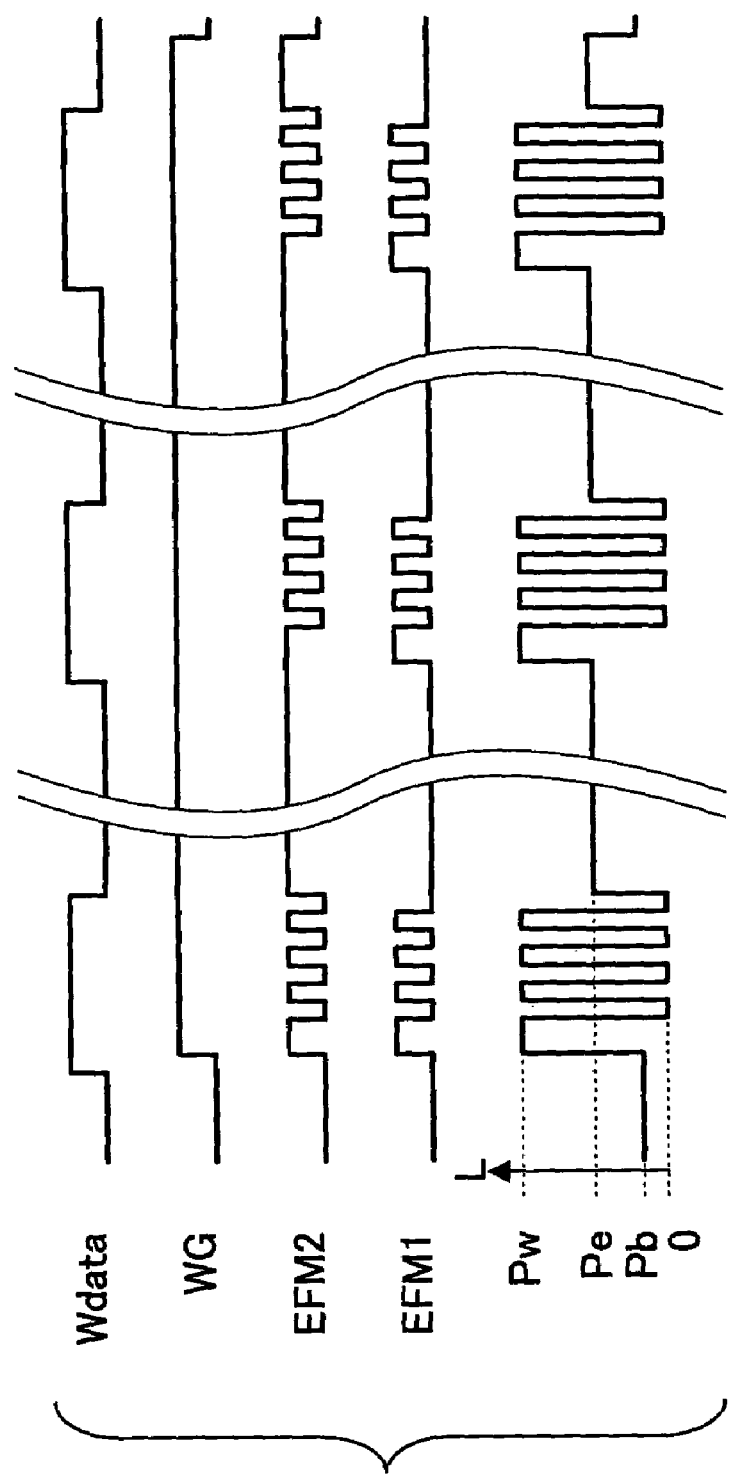
FIG. 12 is a timing chart showing the recording operation of the laser controlling circuit.

As shown in FIG. 10 as a non-limiting example, the laser controlling circuit 124 includes a write-pulse generating circuit 241, an I/V amplifier 242, two sample-&-hold circuits 243 and 244, four DA converters (DAC) 245, 246, 247, and 248, three switches sw1, sw2, and sw3, two comparator circuits 251 and 252, two low-pass filters (LPF) 253 and 254, two amplifiers 255 and 256, and three electric current amplifiers 257, 258, and 259. Commodity articles of mass production available at inexpensive prices may be used as components making up the laser controlling circuit 124. The emission power for creating a mark is comprised of multipulses, and each pulse is configured to have a substantially rectangle shape The write-pulse generating circuit 241 generates write-pulse signals EFM1 and EFM2 (see FIG. 12) based on the write signal Wdata from the encoder 125, the synchronizing signals from the decoder 128e, the recording strategy information stored in the flash memory 139, etc. The signal EFM1 is a pulse signal that changes from LOW to HIGH at the timing of a heating pulse. The signal EFM2 is a pulse signal that changes to HIGH at the timing of the heating power and the erase power.

The I/V amplifier 242 converts the monitor signal supplied from the light receiving device PD2 into a voltage signal, and amplifies the signal by a predetermined gain factor.

The sample-&-hold circuits 243 and 244 samples and holds the output signal of the I/V amplifier 242 in synchronization with a timing signal supplied from a timing-signal generating circuit (not shown). In this example, a signal level corresponding to the write power Pw is sampled and held.

Figure 11A:
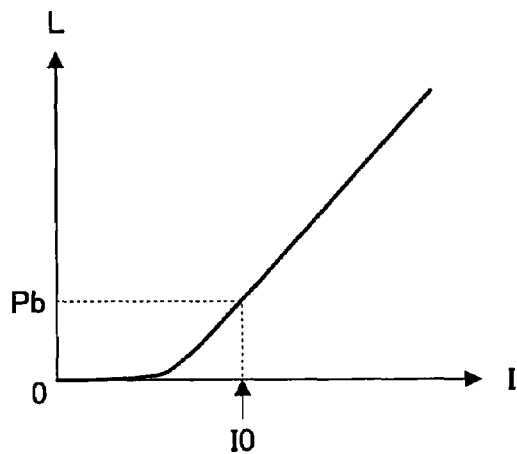
FIGS. 11A through 11D are diagrams showing the relationships between electric currents and the power of light emission.

The DA converter 245 converts a digital signal supplied from the CPU 140 into an analog signal (a fourth electric current signal). This digital signal corresponds to an electric current amount I0 that makes the emission power equal to base power Pb as shown in FIG. 11A as a non-limiting example.

Figure 11B:
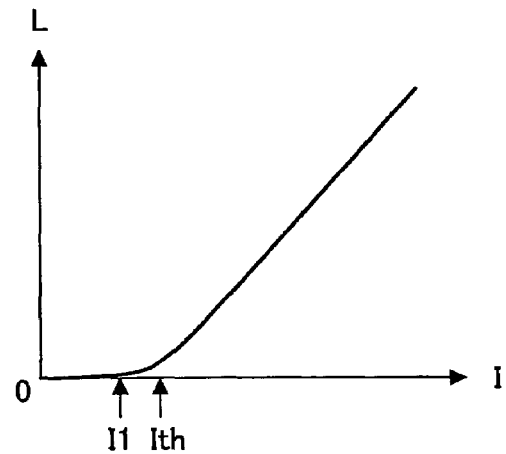

The DA converter 246 converts a digital signal supplied from the CPU 140 into an analog signal (a first electric current signal). As shown in FIG. 11B as a non-limiting example, this digital signal corresponds to an electric current amount I1 where the emission power remains around zero even when the electric current amount I1 is supplied to the semiconductor laser LD. Here, I1 is smaller than the threshold Ith of the glow characteristic.

Figure 11C:
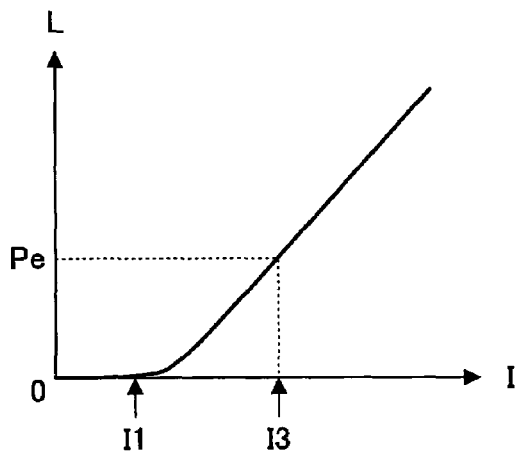

The DA converter 248 converts a digital signal supplied from the CPU 140 into an analog signal (a third electric current signal). This digital signal corresponds to a difference between the electric current amount I0 and an electric current amount I3 that makes the emission power equal to the erase power Pe as shown in FIG. 11C as a non-limiting example.

Figure 11D:
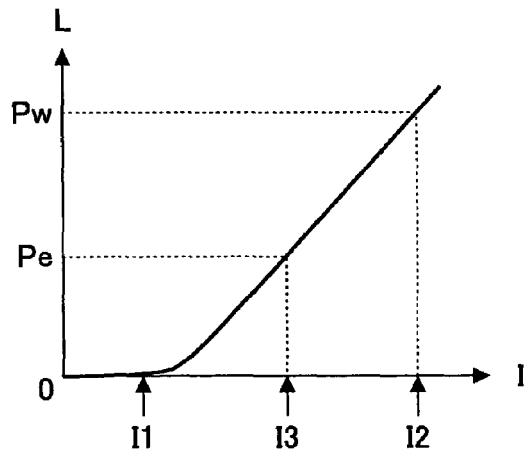

The DA converter 247 converts a digital signal supplied from the CPU 140 into an analog signal (a second electric current signal). This digital signal corresponds to a difference between the electric current amount I3 and an electric current amount I2 that makes the emission power equal to the write power Pw as shown in FIG. 11D as a non-limiting example.

The switch sw1 selects the output (fourth electric current signal) of the DAC 245 when the write-gate signal (hereinafter referred to as a WG signal) is LOW, and selects the output (first electric current signal) of the DAC 246 when the WG signal is HIGH. In this example, the WG signal changes from LOW to HIGH at the start of recording, and changes from HIGH to LOW at the end of recording.

The switch sw2 selects an output of the write-pulse generating circuit 241 to supply the signal EFM2 to the electric current amplifier 257 when the WG signal is HIGH, so that the electric current amplifier 257 switches between an ON state and an OFF state in response to the signal EFM. The switch sw2 selects a power-supply terminal when the WG signal is LOW, so that the electric current amplifier 257 is placed in an ON state at all times.

The switch sw3 responds to a switch signal from the CPU 140, and selects either one of the node coupled to the switch sw2 and the node coupled to the ground potential. The ground node serves to put the electric current amplifier 257 in the OFF state at all times.

The comparator circuit 251 compares the signal supplied via the switch sw1 and the output signal of the sample-&-hold circuit 243, and outputs a result of comparison. The comparator circuit 252 compares the output signal of the DAC 247 and the output signal of the sample-&-hold circuit 244, and outputs a result of comparison.

The low-pass filter 253 removes high-frequency components from the output signal of the comparator circuit 251. The low-pass filter 254 removes high-frequency components from the output signal of the comparator circuit 252.

The amplifier 255 amplifies the output signal of the low-pass filter 253. The amplifier 256 amplifies the output signal of the low-pass filter 254.

The electric current amplifier 257, when turned on, amplifies the output signal of the amplifier 255 by a predetermined gain factor. The electric current amplifier 258, when turned on, amplifies the output signal of the amplifier 256 by a predetermined gain factor. The electric current amplifier 259, when turned on, amplifies the output signal of the DAC 248 by a predetermined gain factor. When these electric current amplifiers are tuned off, the respective input signals are blocked, so that there is no output signals coming out of the electric current amplifiers.

In the following, a description will be given of the recording operation of the laser controlling circuit 124 as described above with reference to the timing chart of FIG. 12. At the beginning, the signals EFM1 and EFM2 and the WG signal are LOW. Further, the switch sw1 selects the output signal of the DAC 245, the switch sw2 the power-supply terminal, and the switch sw3 the node coupled to the switch sw2. Accordingly, the emission power is equal to the base power Pb.

The WG signal changes from LOW to HIGH at the start of recording. In response, the switch sw1 selects the output signal of the DAC 246, and the switch sw2 selects the node to which the signal EFM2 is supplied.

When both of the signals EFM1 and EFM2 become HIGH, all the electric current amplifiers are turned on. The output signals of these electric current amplifiers are all combined to create a drive signal (having the electric current amount I2) for provision to the semiconductor laser LD. As a result, the semiconductor laser LD emits light with the emission power Pw.

When both of the signals EFM1 and EFM2 become LOW, all the electric current amplifiers are turned off. In this case, the drive signal supplied to the semiconductor laser LD becomes zero, and the emission power of the semiconductor laser LD becomes zero.

In this manner, a state in which both of the signals EFM1 and EFM2 are HIGH and a state in which both of the signals EFM1 and EFM2 are LOW alternate repeatedly during the time a mark is created. The semiconductor laser LD thus alternates between a turned-on state (with the emission power Pw) and a turned-off state When the signal EFM1 becomes LOW, and the signal EFM2 becomes HIGH, the electric current amplifiers 257 and 259 are both turned on, whereas the electric current amplifier 258 is turned off. In this case, the drive signal is the sum of the output signal of the electric current amplifier 257 and the output signal of the electric current amplifier 259, and its electric current amount is I3 This drive signal is supplied to the semiconductor laser LD. The semiconductor laser LD thus glows with the emission power Pe.

At the end of recording, the WG signal changes from HIGH to LOW. In response, the switch sw1 selects the output signal of the DAC 245, and the switch sw2 selects the power-supply terminal. At this time, the signals EFM1 and EFM2 are both LOW, so that the output signal of the electric current amplifier 257 is supplied as the drive signal (having the current amount I0) to the semiconductor laser LD. As a result, the emission power of the semiconductor laser LD becomes Pb.

With this provision, a rapid transmission from a heating pulse to a cooling pulse or from a cooling pulse to a heating pulse is successfully made even when recording speed is increased.

Moreover, when neither recording nor reproduction is performed, the CPU 140 issues an instruction such that the switch sw3 selects the ground terminal.

As can be understood from the above description, the laser controlling circuit 124 according to this embodiment provides a current-signal source comprised of the four DACs 245, 246, 247, and 248. Further, a drive-signal generating unit is implemented by the write-pulse generating circuit 241, the three electric current amplifiers 257, 258, and 259, and the three switches sw1, sw2, and sw3. Moreover, an electric-current-signal adjusting unit is implemented by the two sample-&-hold circuits 243 and 244 and the two comparator circuits 251 and 252.

In the optical disc apparatus 120 according to this embodiment, a recording unit is implemented by the optical pickup device 123, the encoder 125, the CPU 140, and the programs executed by the CPU 140. It should be noted that all or part of the processing performed by the CPU 140 may alternatively be implemented by hardware.

As described above, the laser controlling circuit 124 according to this embodiment has the DAC 246 (part of the electric-current-signal source) that produces an electric current signal (having amount I1: the first electric current signal) where the emission power remains around zero even when this electric current signal is supplied to the semiconductor laser LD. The DAC 248 (part of the electric-current-signal source) produces an electric current signal (the second electric current signal) corresponding to a difference between the electric current amount I1 and an electric current amount I3 corresponding to the erase power Pe. The DAC 247 (part of the electric-current-signal source) produces an electric current signal (the third electric current signal) corresponding to a difference between the electric current amount I3 and an electric current amount I2 corresponding to the write power Pw.

When information is to be recorded on the optical disc 115, the ON/OFF state of the electric current amplifiers (part of the drive-signal generating unit) is controlled in response to the write-pulse signals EFM1 and EFM2 supplied from the write-pulse generating circuit 241 (part of the drive-signal generating unit), thereby creating marks and spaces. The drive signal for causing the semiconductor laser LD to glow with the write power Pw (peak power) is equal to the sum of three electric current signals. With this provision, the signal levels of current signals output from the DACs do not need to be raised even when the drive signal corresponding to the write power is increased to cope with an increase in recording speed. Because of this, inexpensive articles of commodity available through mass production can be properly used as electrical/electronic components of the laser controlling circuit 124 while preventing a signal delay affecting record quality from occurring in the drive signal. Namely, the drive signal corresponding to the write signal is properly generated with sufficient precision even at high recording speed. This makes it possible to maintain optimum emission power at high recording speed without incurring a cost increase.

During the time of recording, the amount of laser light emitted from the semiconductor laser LD is monitored. Based on the monitor signal, the sample-&-hold circuit 243 and the comparator circuit 251 together adjust the first electric current signal such that the total electric current of the sum of the output of the electric current amplifier 257 and the output of the electric current amplifier 259 becomes substantially equal to the electric current amount of the drive signal corresponding to the erase power Pe. Based on the monitor signal, further, the sample-&-hold circuit 244 and the comparator circuit 252 together adjust the second electric current signal such that the total electric current of the sum of the outputs from all the electric current amplifiers becomes substantially equal to the electric current amount of the drive signal corresponding to the write power Pw. This provision makes it possible to cope with a change in the glow characteristic of the semiconductor laser LD in real-time when such change is brought about by a temperature increase during the time of recording, for example.

According to the optical disc apparatus 120 of the present embodiment, the drive signal generated by the laser controlling circuit 124 drives the semiconductor laser LD, thereby maintaining optimum emission power at high recording speed. This makes it possible to achieve stable, high-speed recording.

The embodiment described above has been described with reference to a case in which three electric current signals are added together to generate a drive signal for the write power Pw. The invention is not limited to such configuration, and four or more electric current signals may be added.

The embodiment described above has been described with reference to a case in which the DACs convert digital signals from the CPU 140 into analog signals. Alternatively, registers may be provided for the respective DACs, and the CPU 140 may set values in these registers. In this case, the DACs outputs analog signals based on the respective register values. If it suffices to have fixed values set in the registers, the registers may be configured such that these fixed values are stored without an intervention from the CPU 140. This reduces the load on the CPU 140.

In the above embodiment, the optical disc 115 has been assumed to be an information recording medium complying with the CD-RW standard. The present invention, however, is not limited to such a configuration. The information recording medium may as well be a rewritable optical disc complying with the DVD-RW standard or the DVD+RW standard.

Moreover, the optical disc 115 may be a write-once optical disc such as a CD-R, DVD-R, or DVD+R.

Figure 14:
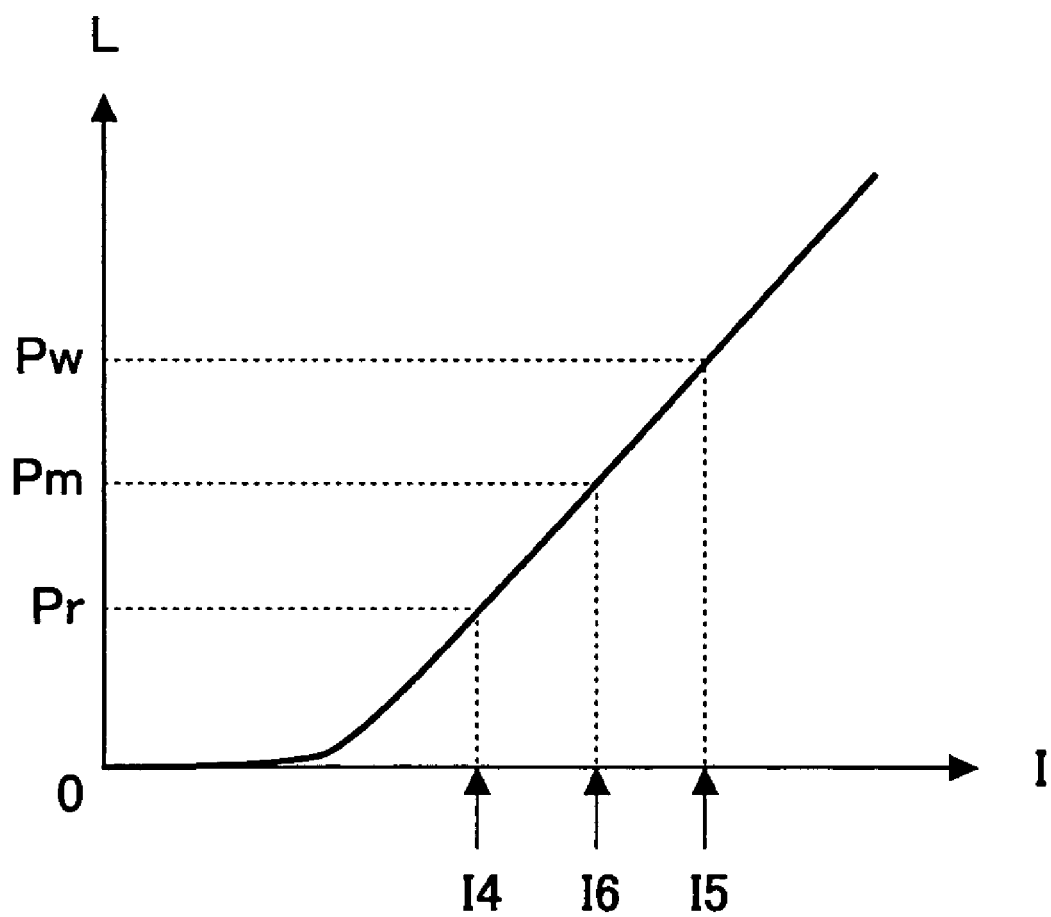
FIG. 14 is a diagram showing the relationships between electric currents and the power of light emission.
Figure 15:
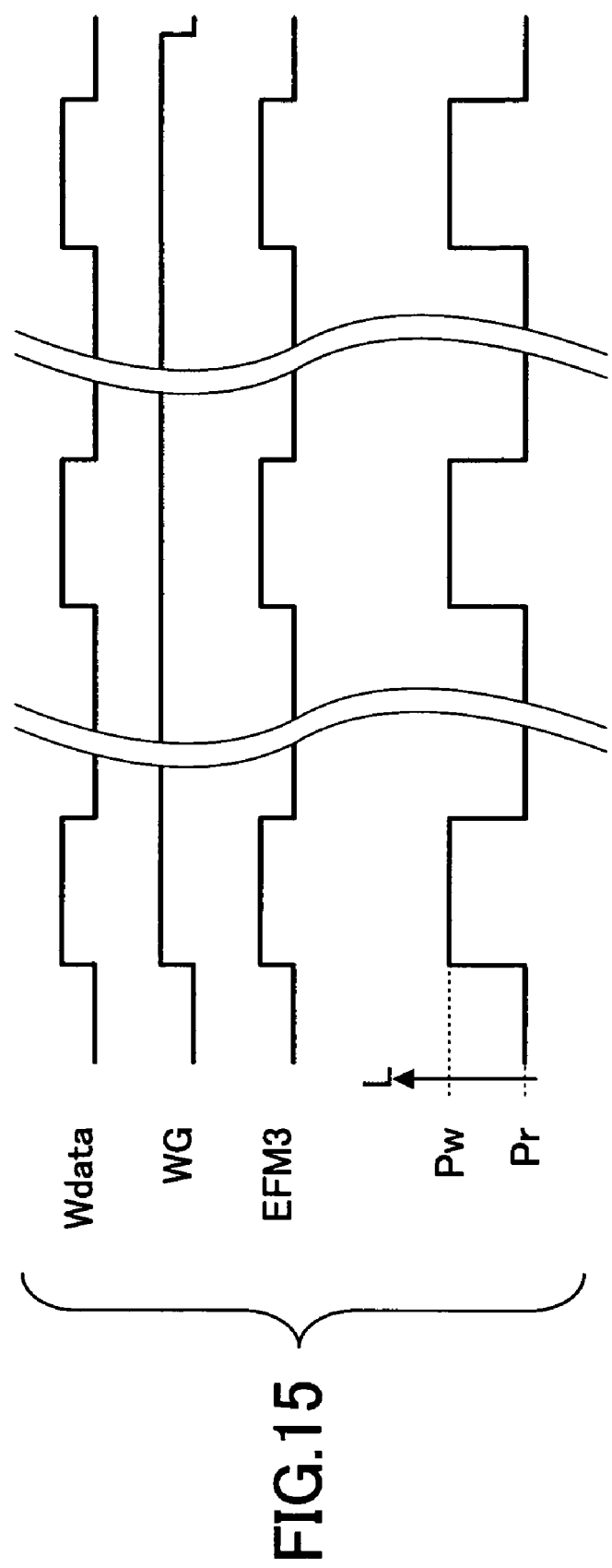
FIG. 15 is a timing chart showing the recording operation of the laser controlling circuit of FIG. 13.

In the following, a description will be given of a case in which an information recording medium complying with the CD-R standard is used as the optical disc 115, with reference to FIG. 13 through FIG. 15. The control of emission power is performed by using a single-pulse recording method.

Figure 13:
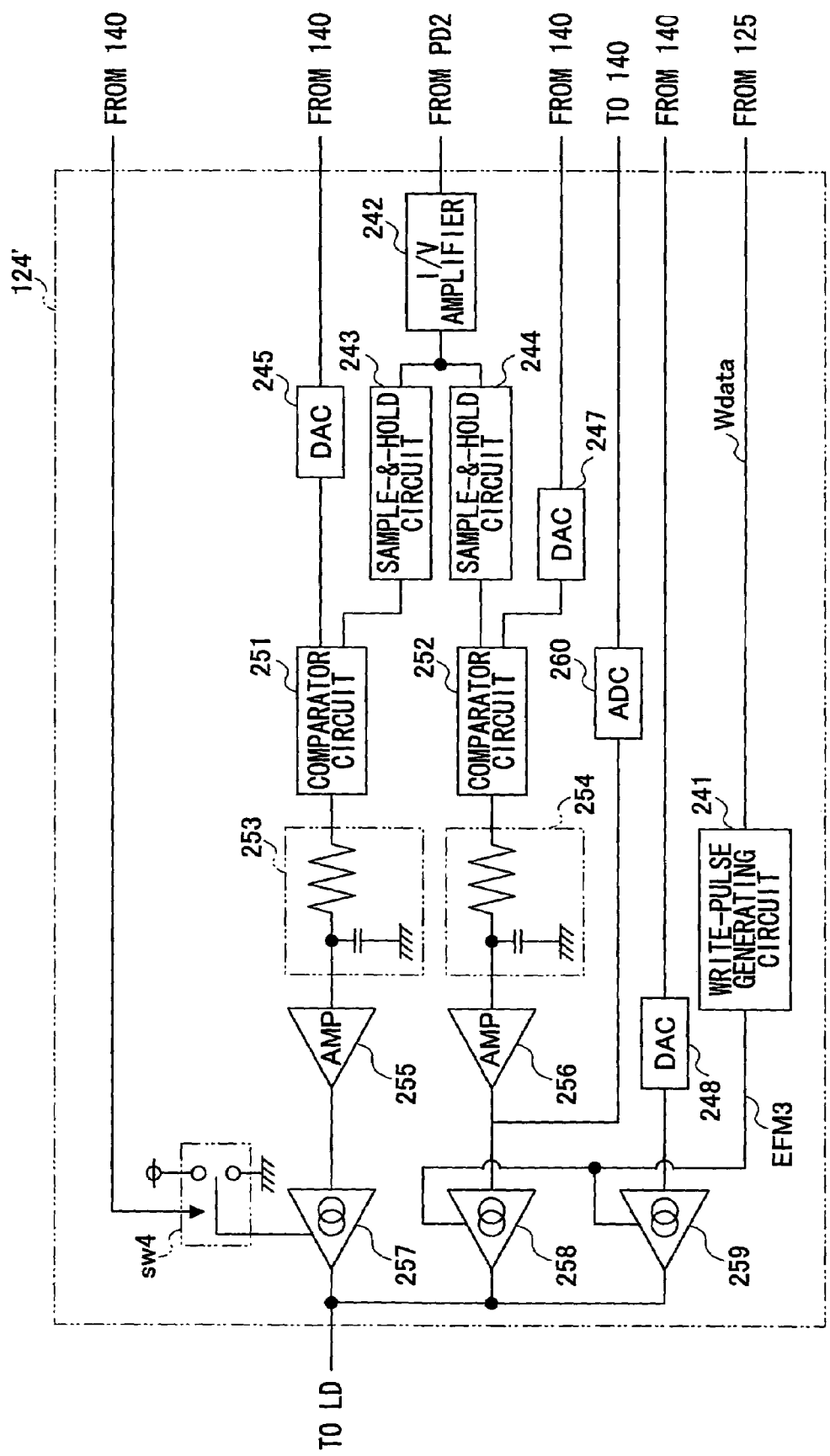
FIG. 13 is an illustrative drawing showing the construction of a laser controlling circuit in a case in which an information recording medium complying with the CD-R standard is used as the optical disc.

In this embodiment, a laser controlling circuit 124' shown in FIG. 13 as a non-limiting example is used in place of the laser controlling circuit 124 of the previous embodiment. The laser controlling circuit 124' includes the write-pulse generating circuit 241, the I/V amplifier 242, the two sample-&-hold circuits 243 and 244, the three DA converters (DAC) 245, 247, and 248, a switch sw4, the two comparator circuits 251 and 252, the two low-pass filters (LPF) 253 and 254, the two amplifiers 255 and 256, the three electric current amplifiers 257, 258, and 259, and an AD converter (ADC) 260. In the following, a description will be given with a main focus on differences between the laser controlling circuit 124 and the laser controlling circuit 124'. In so doing, portions that perform the identical or similar processing or operations to those of the laser controlling circuit 124 will be described only briefly or a description thereof will be omitted.

It should be noted that the AD converter 260 is unnecessary if the CPU 150 is provided with an ADC and an analog signal is supplied from the laser controlling circuit 124' to the CPU 140 via such an ADC.

The sample-&-hold circuit 243 is configured to sample and hold a signal level corresponding to the read power Pr. The sample-&-hold circuit 244 is configured to sample and hold a signal level corresponding to the write power Pw.

The DA converter 245 converts a digital signal supplied from the CPU 140 into an analog signal (a first electric current signal). This digital signal corresponds to an electric current amount I4 that makes the emission power equal to the read power Pr as shown in FIG. 14 as a non-limiting example.

The DA converter 248 converts a digital signal supplied from the CPU 140 into an analog signal (a third electric current signal). This digital signal corresponds to a difference between the electric current amount I4 and an electric current amount I6 that makes the emission power equal to Pm (middle power between Pw and Pr).

The DA converter 247 converts a digital signal supplied from the CPU 140 into an analog signal (a second electric current signal). This digital signal corresponds to a difference between the electric current amount I6 and an electric current amount I5 that makes the emission power equal to the write power Pw.

The switch sw4 responds to a switch signal supplied from the CPU 140, and selects either one of a power-supply terminal for causing the electric current amplifier 257 to be turned on all the time and a ground terminal for causing the electric current amplifier 257 to be turned off all the time.

The write-pulse generating circuit 241 generates a write-pulse signal EFM3 (see FIG. 15) based on the write signal Wdata from the encoder 125, the synchronizing signals from the decoder 128e, the recording strategy information stored in the flash memory 139, etc. The signal EFM3 is a pulse signal that becomes HIGH at the timing of the write power.

The AD converter 260 converts the output of the amplifier 260 into a digital signal for provision to the CPU 140.

In the following, a description will be given of the recording operation of the laser controlling circuit 124' as described above, with reference to a timing chart of FIG. 15. At the beginning, the signal EFM3 and the WG signal are LOW, and the switch sw4 selects the power-supply terminal. Accordingly, the emission power is equal to the read power Pr.

When the signal EFM3 becomes HIGH after the start of recording, all the electric current amplifiers are turned on. The output signals of these electric current amplifiers are all combined to create a drive signal (having the electric current amount I5) for provision to the semiconductor laser LD. As a result, the semiconductor laser LD emits light with the emission power Pw.

When the signal EFM3 becomes LOW, the electric current amplifier 257 is turned on whereas the electric current amplifiers 258 and 259 are turned off. In this case, the drive signal equal to the output of the electric current amplifier 257 and having the electric current amount I4 is supplied to the semiconductor laser LD. The semiconductor laser LD thus glows with the emission power Pr.

In this manner, the three electric current signals are combined together to generate a drive signal when a mark is to be formed. This provides the same advantages as does the previous embodiment.

The CPU 140 may store the signal level of the output of the amplifier 256 immediately before the suspension of recording when the recording is temporarily suspended due to buffer under-run or the like. After. recording resumes, the CPU 140 may supply signal to the DAC 248 such that the current amount of the drive signal becomes I2 even when the output of the amplifier 256 has a signal level substantially equal to zero. With this provision, the emission power of the semiconductor laser LD can be set to Pw immediately after the resumption of recording even if the through rate of the low-pass filter 254 is low. This successfully prevents data from being lost around the timing of a break of data recording.

Figure 17:
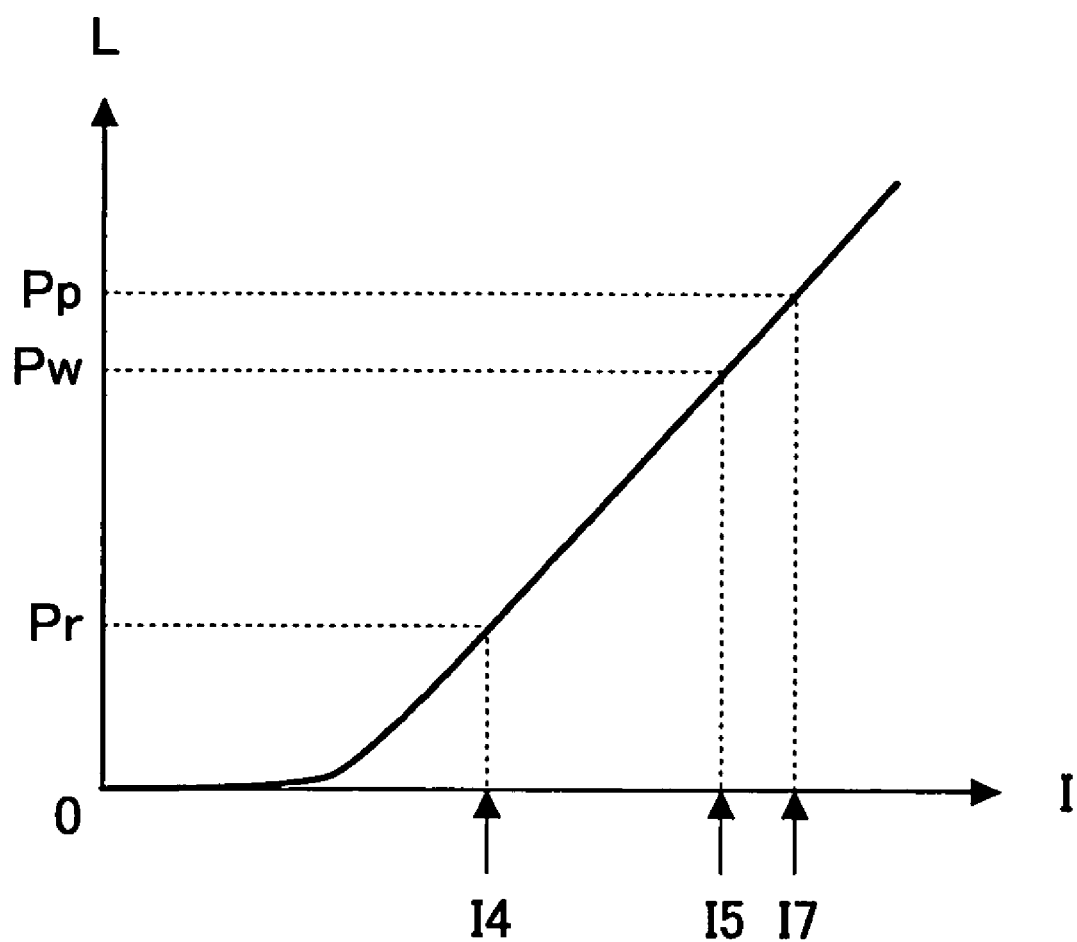
FIG. 17 is a diagram showing the relationships between electric currents and the power of light emission.
Figure 18:
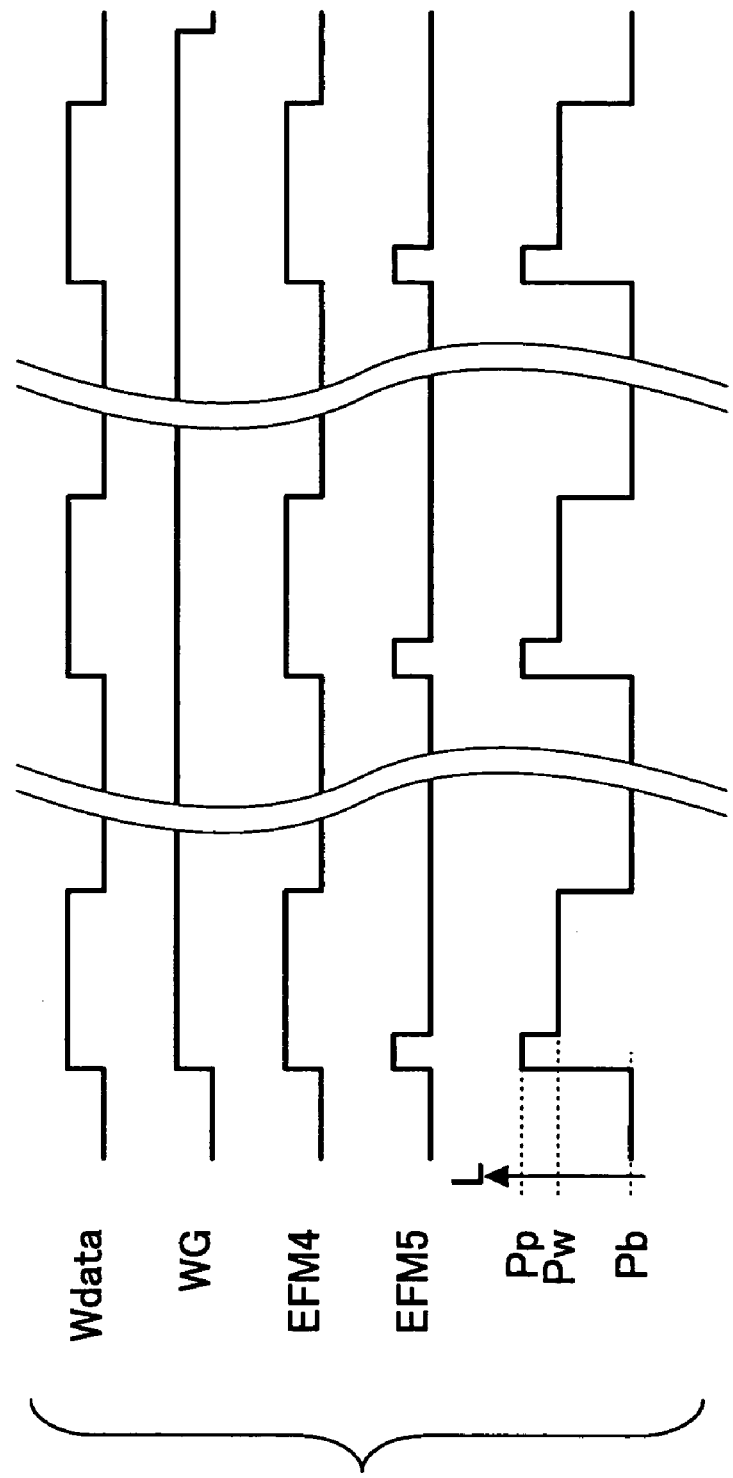
FIG. 18 is a timing chart showing the recording operation of the laser controlling circuit of FIG. 16.

In the following, a description will be given of a case in which an information recording medium complying with the CD-R standard is used as the optical disc 115, with reference to FIG. 16 through FIG. 18. In this case, the power of the leading edge of a pulse is set higher than the write power Pw (such power is hereinafter referred to as peak power Pp).

Figure 16:
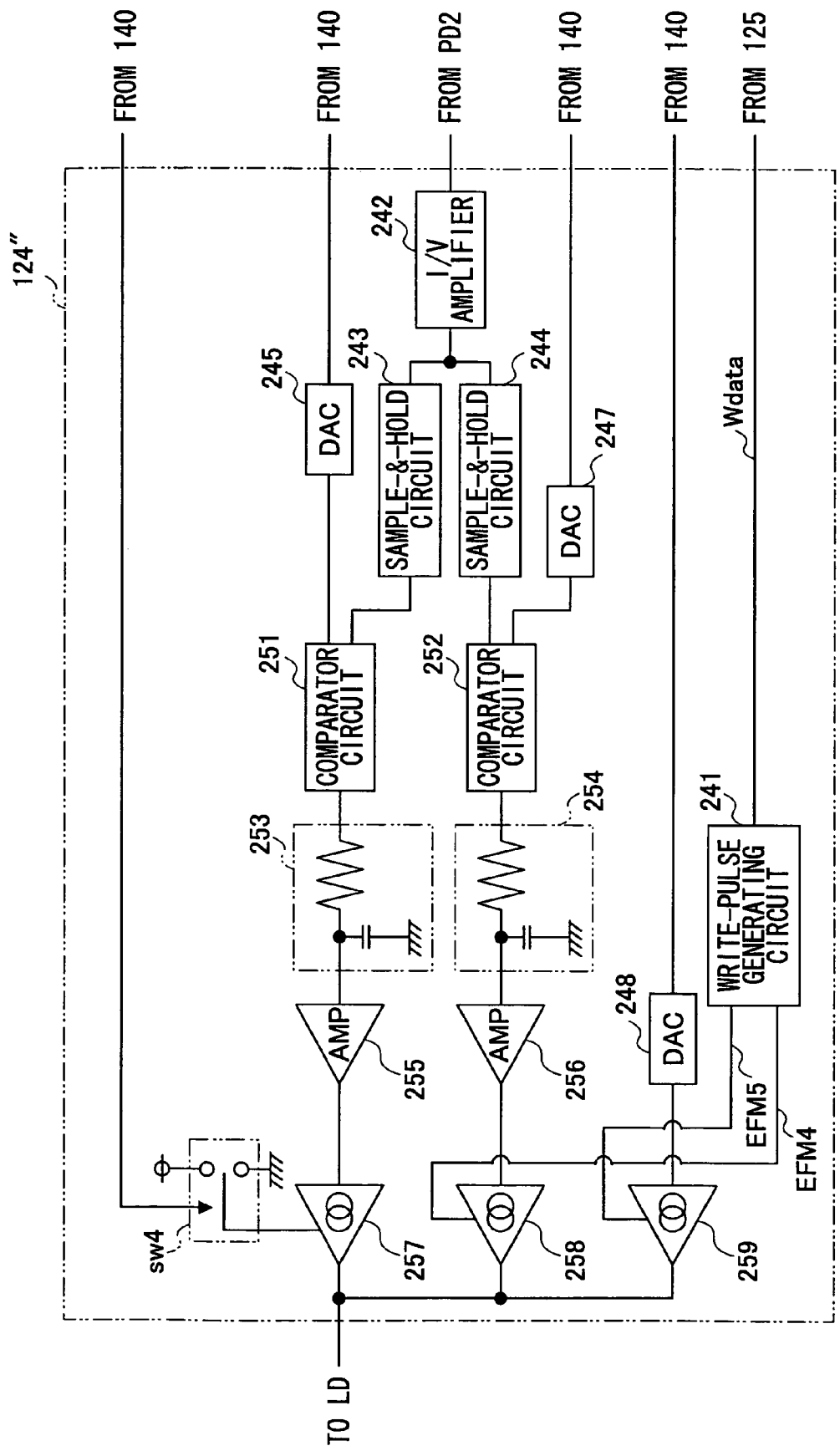
FIG. 16 is an illustrative drawing showing a variation of the construction of a laser controlling circuit in a case in which an information recording medium complying with the CD-R standard is used as the optical disc.

In this embodiment, a laser controlling circuit 124" shown in FIG. 16 as a non-limiting example is used in place of the laser controlling circuit 124 of the previous embodiment. The laser controlling circuit 124" includes the write-pulse generating circuit 241, the I/V amplifier 242, the two sample-&-hold circuits 243 and 244, the three DA converters (DAC) 245, 247, and 248, the switch sw4, the two comparator circuits 251 and 252, the two low-pass filters (LPF) 253 and 254, the two amplifiers 255 and 256, and the three electric current amplifiers 257, 258, and 259. In the following, a description will be given with a main focus on differences between the laser controlling circuit 124 and the laser controlling circuit 124". In so doing, portions that perform the identical or similar processing or operations to those of the laser controlling circuit 124 will be described only briefly or a description thereof will be omitted.

The sample-&-hold circuit 243 is configured to sample and hold a signal level corresponding to the peak power Pp. The sample-&-hold circuit 244 is configured to sample and hold a signal level corresponding to the write power Pw.

The DA converter 245 converts a digital signal supplied from the CPU 140 into an analog signal (a first electric current signal). This digital signal corresponds to an electric current amount I4 that makes the emission power equal to the read power Pr as shown in FIG. 17 as a non-limiting example.

The DA converter 247 converts a digital signal supplied from the CPU 140 into an analog signal (a second electric current signal). This digital signal corresponds to a difference between the electric current amount I4 and an electric current amount I5 that makes the emission power equal to the write power Pw.

The DA converter 248 converts a digital signal supplied from the CPU 140 into an analog signal (a third electric current signal). This digital signal corresponds to a difference between the electric current amount I5 and an electric current amount I7 that makes the emission power equal to the peak power Pp.

The write-pulse generating circuit 241 generates write-pulse signals EFM4 and EFM5 (see FIG. 18) based on the write signal Wdata from the encoder 125, the synchronizing signals from the decoder 128e, the recording strategy information stored in the flash memory 139, etc. The signal EFM4 is a pulse signal that becomes HIGH at the timing of the peak power and the write power. The signal EFM5 is a pulse signal that becomes HIGH at the timing of the peak power.

The AD converter 260 converts the output of the amplifier 260 into a digital signal for provision to the CPU 140.

In the following, a description will be given of the recording operation of the laser controlling circuit 124" as described above, with reference to a timing chart of FIG. 18. At the beginning, the signals EFM4 and EFM5 are both LOW, and the switch sw4 selects the power-supply terminal. Accordingly, the emission power is equal to the read power Pr.

When the signals EFM4 and EFM5 both become HIGH after the start of recording, all the electric current amplifiers are turned on. The output signals of these electric current amplifiers are all combined to create a drive signal (having the electric current amount I7) for provision to the semiconductor laser LD. As a result, the semiconductor laser LD emits light with the emission power Pp.

When the signal EFM5 becomes LOW while the signal EFM4 is HIGH, the electric current amplifiers 257 and 258 are turned on whereas the electric current amplifier 259 is turned off. In this case, the drive signal equal to the sum of the outputs of the electric current amplifiers 257 and 258 and having the electric current amount I5 is supplied to the semiconductor laser LD. The semiconductor laser LD thus glows with the emission power Pw.

When the signals EFM4 and EFM5 both become LOW, the electric current amplifier 257 is turned on whereas the electric current amplifiers 258 and 259 are turned off. In this case, the drive signal equal to the output of the electric current amplifier 257 and having the electric current amount I4 is supplied to the semiconductor laser LD. The semiconductor laser LD thus glows with the emission power Pr.

In this manner, the three electric current signals are combined together to generate a drive signal when the head portion of a mark is to be formed. This provides the same advantages as does the previous embodiment.

The optical disc 115 may be an information recording medium complying with the next-generation DVD standard in which a light beam having a wavelength of 405 nm is used.

The above embodiments have been described with reference to an optical disc apparatus that is capable of both recording and reproducing of information. The present invention is not limited to such a configuration, and is applicable to an optical disc apparatus that is capable of at least recording of information among the recording, reproducing, and erasing of information.

The above embodiments have been described with reference to a case in which the optical pickup apparatus is provided with a single semiconductor laser. This is not a limiting example, and the present invention is equally applicable to a configuration in which a plurality of semiconductor lasers emit light beams having respective different wavelengths. In this case, at least one of a semiconductor laser emitting a laser beam having a wavelength of 405 nm, a semiconductor laser emitting a laser beam having a wavelength of 660 nm, and a semiconductor laser emitting a laser beam having a wavelength of 780 nm may be included. Namely, the optical disc apparatus may be capable of coping with different types of optical discs that comply with different types of standards. In such a case, the control of emission power may be performed independently on each semiconductor laser.

Further, the present invention is not limited to these embodiments, but various variations and modifications may be made without departing from the scope of the present invention.

The present application is based on Japanese priority applications No. 2003-303207 filed on Aug. 27, 2003 and No. 2003-432519 filed on Dec. 26, 2003, with the Japanese Patent Office, the entire contents of which are hereby incorporated by reference.

What is claimed is

1. An apparatus for driving a light source that emits a laser beam shone on an optical disc, comprising:
    an electric-current-signal source unit configured to output at least three electric current signals;
    a drive-signal generating unit configured to combine said at least three electric current signals into a single drive signal that causes the light source to emit the laser beam having highest power among all pulses of the laser beam used for recording information on the optical disc; and
    an electric-current-signal adjusting unit,
    the apparatus being configured to drive the light source for recording and reproducing information on and from the optical disc that is a rewritable optical disc, wherein said at least three electric current signals include a first electric current signal, a second electric current signal, and a third electric current signal, the first electric current signal having a signal level smaller than a threshold current level at which the power of the laser beam as a function of an electric current supplied to the light source exhibits a steep rise from a proximity of zero power, the second electric current signal having a signal level substantially equal to a difference between a signal level corresponding to write power and a signal level corresponding to erase power, and the third electric current signal having a signal level substantially equal to a difference between a signal level corresponding to erase power and the signal level of the first electric current signal, and
    wherein the electric-current-signal adjusting unit is configured to adjust the first electric current signal and the second electric current signal in response to a monitor signal indicative of the power of the laser beam.

2. The apparatus as claimed in claim 1, wherein said electric-current-signal source unit further outputs a fourth electric current signal that is set to a signal level corresponding to base power, and said drive-signal generating unit generates a drive signal responsive to the fourth electric current signal to cause the light source to emit the laser beam for reproducing information from the optical disc.

3. The apparatus as claimed in claim 2, wherein said drive-signal generating unit is configured to select either one of the first electric current signal and the fourth electric current signal in response to a write-gate signal.

4. The apparatus as claimed in claim 1, configured to drive the light source for recording and reproducing information on and from the optical disc that is the rewritable optical disc, which complies with one of a CD-RW standard, a DVD-RW standard, and a DVD+RW standard.

5. An apparatus for driving a light source that emits a laser beam shone on an optical disc, comprising:
    an electric-current-signal source unit configured to output at least three electric current signals;
    a drive-signal generating unit configured to combine said at least three electric current signals into a single drive signal that causes the light source to emit the laser beam having highest power among all pulses of the laser beam used for recording information on the optical disc; and
    an electric-current-signal adjusting unit,
    the apparatus being configured to drive the light source for recording and reproducing information on and from the optical disc that is a write-once optical disc, wherein said at least three electric current signals include a first electric current signal, a second electric current signal, and a third electric current signal, the first electric current signal having a signal level substantially equal to a signal level corresponding to read power, the third electric current signal having a signal level substantially equal to a difference between the signal level of the first electric current signal and a signal level corresponding to middle power situated between the read power and write power, and the second electric current signal having a signal level substantially equal to a difference between a signal level corresponding to the write power and the signal level corresponding to the middle power, and
    wherein the electric-current-signal adjusting unit is configured to adjust the first electric current signal and the second electric current signal in response to a monitor signal indicative of the power of the laser beam.

6. The apparatus as claimed in claim 5, configured to drive the light source for recording and reproducing information on and from the optical disc that is the write-once optical disc, which complies with one of a CD-R standard, a DVD-R standard, and a DVD+R standard.

7. An optical disc apparatus for recording information on an optical disc, comprising:
    a light source configured to emit a laser beam shone on the optical disc;
    an electric-current-signal source unit configured to output at least three electric current signals;
    a drive-signal generating unit configured to combine said at least three electric current signals into a single drive signal that causes the light source to emit the laser beam having highest power among all pulses of the laser beam used for recording information on the optical disc;
    an electric-current-signal adjusting unit; and
    a recording unit configured to control said electric-current-signal source unit and said drive-signal generating unit to record information on the optical disc,
    wherein said at least three electric current signals include a first electric current signal, a second electric current signal, and a third electric current signal, the first electric current signal having a signal level smaller than a threshold current level at which the power of the laser beam as a function of an electric current supplied to the light source exhibits a steep rise from a proximity of zero power, the second electric current signal having a signal level substantially equal to a difference between a signal level corresponding to write power and a signal level corresponding to erase power, and the third electric current signal having a signal level substantially equal to a difference between a signal level corresponding to the erase power and the signal level of the first electric current signal, and
    wherein the electric-current-signal adjusting unit is configured to adjust the first electric current signal and the second electric current signal in response to a monitor signal indicative of the power of the laser beam.

* * * * *